US006827771B2

(12) United States Patent
Omatsu et al.

(10) Patent No.: US 6,827,771 B2
(45) Date of Patent: Dec. 7, 2004

(54) INK COMPOSITIONS FOR INKJET RECORDING

(75) Inventors: Tadashi Omatsu, Kanagawa (JP); Masaki Noro, Kanagawa (JP); Toshiki Fujiwara, Kanagawa (JP)

(73) Assignee: Fuji Photo Film Co., Ltd., Minami Ashigara (JP)

(*) Notice: Subject to any disclaimer, the term of this patent is extended or adjusted under 35 U.S.C. 154(b) by 158 days.

(21) Appl. No.: 10/119,897

(22) Filed: Apr. 11, 2002

(65) Prior Publication Data

US 2003/0097959 A1 May 29, 2003

(30) Foreign Application Priority Data

Apr. 12, 2001 (JP) .................................... P.2001-114186

(51) Int. Cl.$^7$ ......................... C09D 11/00; C09D 11/02; B41J 2/01

(52) U.S. Cl. ............................... 106/31.47; 106/31.43; 106/31.46; 106/31.48; 106/31.49; 347/100

(58) Field of Search .......................... 106/31.47, 31.43, 106/31.46, 31.48, 31.49; 347/100

(56) References Cited

U.S. PATENT DOCUMENTS 5,462,590 A 10/1995 Yui et al.
6,048,390 A * 4/2000 Yano et al. .............. 106/31.43
6,102,997 A * 8/2000 Helling et al. ........... 106/31.43
6,582,502 B2 6/2003 Fujiwara
2002/0050226 A1 * 5/2002 Oki et al. ................ 106/31.46
2002/0096082 A1 * 7/2002 Omatsu et al. ............ 106/31.5
2003/0070582 A1 * 4/2003 Kitamura et al. ........ 106/31.46
2004/0045478 A1 3/2004 Tateishi et al.

FOREIGN PATENT DOCUMENTS

| | | | |
|---|---|---|---|
| EP | 0 882 600 | A2 | 12/1998 |
| EP | 0 909 798 | A1 | 4/1999 |
| EP | 0 913 434 | A1 | 5/1999 |
| JP | 2001-279145 | A | 10/2001 |
| JP | 2002-302623 | A | 10/2002 |
| JP | 2002-309118 | A | 10/2002 |
| JP | 2002-371079 | A | 12/2002 |
| WO | WO 02/083662 | A2 | 10/2002 |

OTHER PUBLICATIONS

EPO Search Report dated Sep. 5, 2002 in EP Application No. EP 02 00 8394.

* cited by examiner

*Primary Examiner*—Helene Klemanski
(74) *Attorney, Agent, or Firm*—Burns, Doane, Swecker & Mathis, L.L.P.

(57) ABSTRACT

An ink composition for inkjet recording comprising:

an azo dye having an aromatic nitrogen-containing 6-membered heterocycle as a coupling component; a compound represented by the following formula (I); and an aqueous medium wherein the azo dye is dissolved or dispersed in the aqueous medium:

(I)

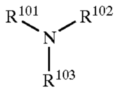

5 Claims, No Drawings

INK COMPOSITIONS FOR INKJET RECORDING

FIELD OF THE INVENTION

The present invention relates to an ink composition for inkjet recording (which will hereinafter be called "inkjet recording ink composition") capable of providing high-quality recorded images, excellent in discharge stability and also excellent in shelf life of the images thus formed; and also to an inkjet recording method.

BACKGROUND OF THE INVENTION

With recent widespread use of computers, inkjet printers have come to be used not only at offices but also at home for printing images on paper, film or cloth. As an ink for inkjet recording, oil-based inks, aqueous inks and solid inks are known. Of these, aqueous inks are most popularly employed in consideration of manufacturing ease, handling ease, odor and safety.

Although many aqueous inks have merits in high transparency and high color density because of containing a water-soluble dye which is dissolved in a molecular state, they are accompanied with the drawbacks that owing to inferior water resistance, bleeding occurs when printed on so-called plain paper, leading to a deterioration in the print quality and moreover, they are markedly inferior in the shelf life of images, more specifically, light fastness and resistance to oxidizing gases (such as $SO_x$, $NO_x$ and ozone).

A variety of aqueous inks have been proposed using a pigment or a disperse dye with a view toward overcoming the above-described drawbacks. These proposals are described, for example, in Japanese Patents Laid-Open Nos. 157468/1981, 18468/1992, 110126/1998 and 195355/1998. These aqueous inks have improved water resistance, but not completely improved. Particularly, pigment inks involve such problems as that they are inferior in color development to dye inks and insufficient storage stability of a dispersion tends to cause clogging at the discharge outlet. Disperse dyes are, on the other hand, comparable to water soluble dyes in transparency and color density, but the shelf life of images cannot be heightened to the level of water soluble dyes.

A method of encapsulating a dye in urethane polymer latex particles is proposed in Japanese Patent Laid-Open No. 45272/1983, but this method involves such a drawback as difficulty in obtaining colored particles excellent in dispersion stability when the dye encapsulated in the particles has a desired concentration. In Japanese Patent Laid-Open No. 279873/1998, disclosed is a method of preparing fine colored polymer particles by dissolving an acrylic polymer and an oil soluble dye in an organic solvent and after dispersing, removing the organic solvent. This method is however accompanied with the problem in the quality of recorded images, particularly, quality of images recorded on a photographic paper medium and stability of the quality upon continuous recording.

In Japanese Patent Publication No. 76977/1993, disclosed is an ink composition obtained by dissolving and dispersing an oil soluble dye in an organic solvent. The organic solvent specified therein has, in general, only insufficient compatibility with an oil soluble dye so that recording density is low and it has been revealed that in some cases, precipitation of the dye occurs during storage, causing clogging of a nozzle.

In Japanese Patent Laid-Open No. 16171/1990, proposed is use of a dye excellent in color development and shelf life of images in order to prepare an ink composition satisfactory in all of water resistance, color development and shelf life of images. Color cannot be reproduced well because of insufficient color tone and in addition, storage stability of the image thus formed is insufficient.

In Japanese Patent Laid-Open No. 170674/1989, disclosed is an inkjet recording solution containing an ultraviolet absorber and/or antioxidant in order to improve the shelf life of images, but this solution is not sufficient in light fastness.

SUMMARY OF THE INVENTION

Under such situations, there is accordingly a demand for development, as a method capable of attaining all of water resistance, color development and shelf life of images, a technique permitting formation of an image sufficient in image quality, water resistance and shelf life of images by using an ink containing both a dye excellent in color development and shelf life of images and an antifading agent capable of sufficiently improving the image fastness of the dye.

An object of the invention is to provide an aqueous ink, which is advantageous from the viewpoints of handling ease, odor and safety, having high discharge stability and good color development and capable of forming an image excellent in color hue, shelf life, stability and water resistance and to overcome the drawbacks in the image quality such as bleeding of thin lines. A further object of the present invention is to provide an inkjet recording ink composition having high discharge stability even after storage over time under severe conditions and free from defects in color hue, shelf life, stability, water resistance and image quality.

The above-described objects are attained by the following compositions or method:

(1) An inkjet recording ink composition obtained by dissolving or dispersing, in an aqueous medium, an azo dye having an aromatic nitrogen-containing 6-membered heterocycle as a coupling component, wherein the composition contains a compound represented by the following formula (I):

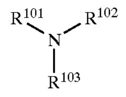

(I)

wherein, $R^{101}$ and $R^{102}$ each independently represents a hydrogen atom, an aliphatic group, an aromatic group, a heterocyclic group, an acyl group, an aliphatic oxycarbonyl group, an aromatic oxycarbonyl group, an aliphatic sulfonyl group, an aromatic sulfonyl group, a substituted or unsubstituted carbamoyl group, or a substituted or unsubstituted thiocarbamoyl group;

$R^{103}$ represents an aliphatic group, an aromatic group, a heterocyclic group, an aliphatic oxy group, an aromatic oxy group, an aliphatic thio group, an aromatic thio group, an acyloxy group, an aliphatic oxycarbonyloxy group, an aromatic oxycarbonyloxy group, a substituted or unsubstituted amino group or a hydroxy group, or any of a pair $R^{101}$ and $R^{102}$, a pair $R^{102}$ and $R^{103}$, and a pair $R^{103}$ and $R^{101}$ may be coupled to form a 5- to 7-membered ring with the proviso that the ring formed is not a 2,2,6,6-tetraalkylpiperidine skeleton.

(2) An inkjet recording ink composition as described in (1), wherein the azo dye is represented by the following formula (A-1):

(A-1)

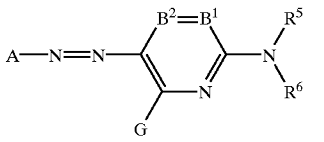

wherein,

A represents a 5-membered heterocyclic group, $B^1$ and $B^2$ represent —$CR^1$═ and —$CR^2$═, respectively, or either one represents a nitrogen atom and the other one represents —$CR^1$═ or —$CR^2$═, G, $R^1$, and $R^2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group substituted with an alkyl, aryl or heterocyclic group, an acylamino group, an ureido group, a sulfamoylamino group, an alkoxycarbonylamino group, an aryloxycarbonylamino group, an alkyl- or arylsulfonylamino group, a heterocyclic sulfonylamino group, a nitro group, an alkyl-, aryl- or heterocyclo-thio group, an alkyl- or aryl-sulfonyl group, a heterocyclic sulfonyl group, an alkyl- or aryl-sulfinyl group, a heterocyclic sulfinyl group, a sulfamoyl group or a sulfo group, which may have a substituent further, $R^5$ and $R^6$ each independently represents a hydrogen atom, an aliphatic group, an aromatic group, a heterocyclic group, an acyl group, an alkoxycarbonyl group, an aryloxycarbonyl group, a carbamoyl group, an alkyl- or aryl-sulfonyl group or a sulfamoyl group, which may have a substituent further, or a pair $R^1$ and $R^5$, or a pair $R^5$ and $R^6$ may be coupled to form a 5- or 6-membered ring.

(3) An inkjet recording ink composition as described in (1) or (2), wherein the compound represented by the formula (I) contains another compound represented by the formula (IA) or (IB):

(IA)

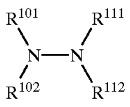

(IB)

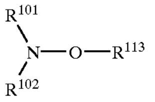

(4) An inkjet recording ink composition as described in (2) or (3), wherein A of the formula (A-1) is represented by any one of the following formulas (a) to (f):

(a)

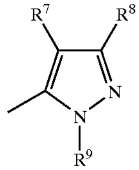

(b)

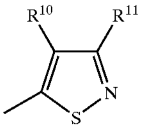

(c)

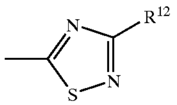

(d)

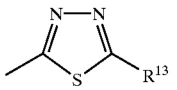

(e)

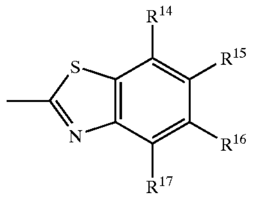

(f)

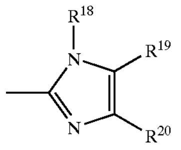

(5) An inkjet recording ink composition as described in any one of (2) to (4), which is prepared by dissolving and/or dispersing, in an aqueous medium, the dye represented by the formula (A-1) when the dye is a water soluble dye.

(6) An inkjet recording ink composition as described in any one of (2) to (4), which is prepared by dissolving the dye represented by the formula (A-1) in a high-boiling-point organic solvent and then dispersing the resulting solution in an aqueous medium, when the dye is an oil soluble dye.

(7) An inkjet recording method, which comprise discharging, according to a recording signal, ink droplets on an image receiving material having, on a substrate thereof, an image receiving layer containing white inorganic pigment particles, and recording an image onto the image receiving material, wherein the ink droplets are made of an inkjet recording ink composition as described in any one of (1) to (6).

DETAILED DESCRIPTION OF THE INVENTION

The invention will hereinafter be described more specifically.

A dye to be used for the inkjet recording ink composition of the invention is an azo dye having as a coupling component an aromatic nitrogen-containing 6-membered heterocycle and that represented by the following formula (A-1) is preferred.

(A-1)

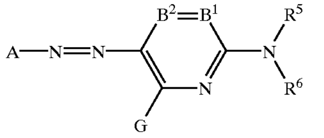

In the formula (A-1), A represents a 5-membered heterocyclic group. Examples of the hetero atom of the 5-membered heterocyclic group include N, O and S. Preferred is a nitrogen-containing 5-membered heterocycle and the heterocycle may be condensed with an aliphatic ring, an aromatic ring or another heterocycle.

Examples of the heterocycle as A include pyrazole ring, imidazole ring, thiazole ring, isothiazole ring, thiadiazole ring, benzothiazole ring, benzoxazole ring and benzoisothiazole ring. Each of these heterocyclic groups may have a substituent further. Of these, the pyrazole ring, imidazole ring, isothiazole ring, thiadiazole ring and benzothiazole ring represented by the below-described formulas (a) to (f) are preferred.

(a)

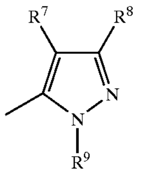

(b)

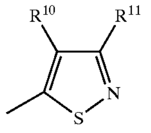

(c)

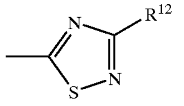

(d)

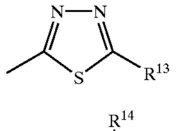

(e)

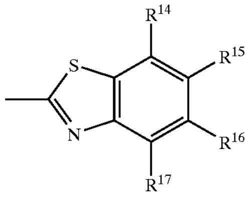

(f)

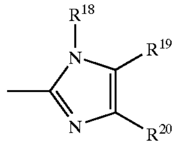

In the above-described formulas (a) to (f), $R^7$ to $R^{20}$ represent the substituents as described in G, $R^1$ and $R^2$.

Of the formulas (a) to (f), preferred are pyrazole and isothiazole rings represented by the formulas (a) and (b), with the pyrazole ring of the formula (a) being most preferred.

$B_1$ and $B_2$ represent —$CR^1$= and —$CR^2$=, respectively, or one of them represents a nitrogen atom and the other one represents —$CR^1$= or —$CR^2$=, of which the former one is preferred.

G, $R^1$ and $R^2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group substituted with an alkyl, aryl or heterocyclic group, an acylamino group, an ureido group, a sulfamoylamino group, an alkoxycarbonylamino group, an aryloxycarbonylamino group, an alkyl or arylsulfonyl group, a heterocyclic sulfonylamino group, a nitro group, an alkyl-, aryl- or heterocyclo-thio group, an alkyl- or aryl-sulfonyl group, a heterocyclic sulfonyl group, an alkyl- or aryl-sulfinyl group, a heterocyclic sulfinyl group, a sulfamoyl group or a sulfo group, which may have a substituent further.

Preferred examples of the substituent represented by G include a hydrogen atom, halogen atoms, aliphatic groups, aromatic groups, a hydroxy group, alkoxy groups, aryloxy groups, acyloxy groups, heterocyclic oxy groups, amino groups substituted with an alkyl, aryl, or heterocyclic group, acylamino groups, an ureido group, a sulfamoylamino group, alkoxycarbonylamino groups, aryloxycarbonylamino groups, and alkyl-, aryl- or heterocyclic thio groups, of which a hydrogen atom, halogen atoms, alkyl groups, a hydroxy group, alkoxy groups, aryloxy groups, acyloxy groups, amino groups substituted with an alkyl, aryl or heterocyclic group, and acylamino groups are preferred, with a hydrogen atom, arylamino groups and amide group being most preferred. Each of these groups may have a substituent further.

Preferred examples of the substituent represented by $R^1$ or $R^2$ include a hydrogen atom, alkyl groups, alkoxycarbonyl groups, a carboxyl group, a carbamoyl group, and a cyano group. Each of these groups may have a substituent further.

$R^5$ and $R^6$ each independently represents a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group or a sulfamoyl group, which may have a substituent further. Preferred examples of the substituent represented by $R^5$ or $R^6$ include a hydrogen atom, aliphatic groups, aromatic groups, heterocyclic groups, acyl groups, and alkyl- or aryl-sulfonyl groups. Of these, a hydrogen atom, aromatic groups, heterocyclic groups, acyl groups, and alkyl- or aryl-sulfonyl groups are more preferred, with a hydrogen atom, aryl groups and heterocyclic groups being most preferred. Each of these groups may have a substituent further. $R^5$ and $R^6$ however do not represent a hydrogen atom simultaneously.

A pair $R^1$ and $R^5$, or a pair $R^5$ and $R^6$ may be coupled to form a 5- or 6-membered ring.

When each of the substituents represented by A, $R^1$, $R^2$, $R^5$, $R^6$ and G has a substituent further, those described in G, $R^1$ and $R^2$ can be given as examples.

When the dye of the invention is a water soluble dye, it has, as a substituent, an ionic hydrophilic group on any one position of A, $R^1$, $R^2$, $R^5$, $R^6$ and G. Examples of the ionic hydrophilic group as a substituent include a sulfo group, carboxyl group, and quaternary ammonium groups. As the ionic hydrophilic group, carboxyl and sulfo groups are preferred, with a sulfo group being especially preferred. The carboxyl and sulfo groups may be in the form of a salt. Examples of the counterion which forms its salt include alkali metal ions (ex. sodium ion and potassium ion) and organic cations (ex. tetramethylguanidium ion). When the dye does not belong to a water soluble dye, it is regarded as an oil soluble dye.

The term "aliphatic group" as used herein means an alkyl group, a substituted alkyl group, an alkenyl group, a substituted alkenyl group, an alkynyl group, a substituted alkynyl group, an aralkyl group or a substituted aralkyl group. The aliphatic group may be branched or alternatively, may form a ring. The aliphatic group preferably has 1 to 20, more preferably 1 to 16 carbon atoms. The aryl portion of the aralkyl or substituted aralkyl group is preferably phenyl or naphthyl, with phenyl being especially preferred.

Examples of the aliphatic group include methyl, ethyl, butyl, isopropyl, t-butyl, hydroxyethyl, methoxyethyl, cyanoethyl, trifluoromethyl, 3-sulfopropyl, 4-sulfobutyl, cyclohexyl, benzyl, 2-phenethyl, vinyl and allyl.

The term "aromatic group" as used herein means an aryl group and a substituted aryl group. As the aryl group, a phenyl or naphthyl group is preferred, with a phenyl group being especially preferred. The aromatic group has preferably 6 to 20, more preferably 6 to 16 carbon atoms.

Examples of the aromatic group include phenyl, p-tolyl, p-methoxyphenyl, o-chlorophenyl and m-(3-sulfopropylamino)phenyl.

The term "heterocyclic group" means a substituted heterocyclic group or an unsubstituted heterocyclic group. The heterocycle may be condensed with an aliphatic ring, an aromatic ring or another heterocycle. As the heterocyclic group, a 5- or 6-membered heterocyclic group is preferred. Examples of the substituent include aliphatic groups, halogen atoms, alkyl- and aryl-sulfonyl groups, acyl groups, acylamino groups, sulfamoyl group, carbamoyl group and ionic hydrophilic groups.

Examples of the heterocyclic group include 2-pyridyl, 2-thienyl, 2-thiazolyl, 2-benzothiazolyl, 2-benzoxazolyl and 2-furyl.

The term "alkyl- or aryl-sulfonyl group" means a substituted alkylsulfonyl group, a substituted aryl sulfonyl group, an unsubstituted alkylsulfonyl group or an unsubstituted arylsulfonyl group. Examples of the alkyl- and aryl-sulfonyl groups include methanesulfonyl group and phenylsulfonyl group, respectively.

The term "alkyl- or aryl-sulfinyl group" means a substituted alkylsulfinyl group, a substituted aryl sulfinyl group, an unsubstituted alkylsulfinyl group and an unsubstituted arylsulfinyl group. Examples of the alkyl- and aryl-sulfinyl groups include methanesulfonyl group and phenylsulfinyl group, respectively.

The term "acyl group" means a substituted acyl group or an unsubstituted acyl group. The acyl group has preferably 1 to 12 carbon atoms. Examples of the substituent include ionic hydrophilic groups. Examples of the acyl group include acetyl and benzoyl.

Examples of the halogen atom include fluorine, chlorine and bromine atoms.

The term "amino group substituted with an alkyl, aryl or heterocyclic group" means an amino group substituted with any one of alkyl groups, aryl groups and heterocyclic groups. The alkyl groups, aryl groups and heterocyclic groups may have a substituent further. An unsubstituted amino group is not embraced in it. As the alkylamino group, that having 1 to 6 carbon atoms is preferred. Examples of the substituent include ionic hydrophilic groups. Examples of the alkylamino groups include methylamino and diethylamino.

The term "arylamino group" means a substituted arylamino group or an unsubstituted arylamino group. As the arylamino group, that having 6 to 12 carbon atoms is preferred. Examples of the substituent include halogen atoms and ionic hydrophilic groups.

Examples of the arylamino group include anilino and 2-chloroanilino.

The term "alkoxy group" means a substituted alkoxy group or an unsubstituted alkoxy group. As the alkoxy group, that having 1 to 12 carbon atoms is preferred. Examples of the substituent include alkoxy groups, hydroxyl group, and ionic hydrophilic groups. Examples of the alkoxy group include methoxy, ethoxy, isopropoxy, methoxyethoxy, hydroxyethoxy and 3-carboxypropoxy.

The term "aryloxy group" means a substituted aryloxy group or an unsubstituted aryloxy group. As the aryloxy group, that having 6 to 12 carbon atoms is preferred. Examples of the substituent include alkoxy groups and ionic hydrophilic groups. Examples of the aryloxy group include phenoxy, p-methoxyphenoxy and o-methoxyphenoxy.

As the silyloxy group, that substituted with a $C_{1-12}$ aliphatic or aromatic group is preferred. Examples of the substituted silyloxy group include trimethylsilyloxy and diphenylmethylsilyloxy.

The term "heterocyclic oxy group" means a substituted heterocyclic oxy group and an unsubstituted heterocyclic oxy group. The heterocyclic oxy group has preferably 2 to 12 carbon atoms. Examples of the substituent include alkyl, alkoxy and ionic hydrophilic groups. Examples of the heterocyclic oxy group include 3-pyridyloxy and 3-thienyloxy.

The term "alkoxycarbonyloxy group" means a substituted alkoxycarbonyloxy group or an unsubstituted alkoxycarbonyloxy group. The alkoxycarbonyloxy group has preferably 2 to 12 carbon atoms. Examples of the alkoxycarbonyloxy group include methoxycarbonyloxy and isopropoxycarbonyloxy.

The term "aryloxycarbonyloxy group" means a substituted aryloxycarbonyloxy group or an unsubstituted aryloxycarbonyloxy group. The aryloxycarbonyloxy group has preferably 7 to 12 carbon atoms. Examples of the aryloxycarbonyloxy group include phenoxycarbonyloxy.

The term "acylamino group" means a substituted acylamino group or an unsubstituted acylamino group. The acylamino group has preferably 2 to 12 carbon atoms. Examples of the substituent include ionic hydrophilic groups. Examples of the acylamino group include acetylamino, propionylamino, benzoylamino, N-phenylacetylamino and 3,5-disulfobenzoylamino.

The term "ureido group" means a substituted ureido group or an unsubstituted ureido group. The ureido group has preferably 1 to 12 carbon atoms. Examples of the substituent include alkyl and aryl groups. Examples of the ureido group include 3-methylureido, 3,3-dimethylureido and 3-phenylureido.

The term "sulfamoylamino group" means a substituted sulfamoylamino group or an unsubstituted sulfamoylamino group. Examples of the substituent include alkyl groups. Examples of the sulfamoylamino group include N,N-dipropylsulfamoylamino.

The term "alkoxycarbonylamino group" means a substituted alkoxycarbonylamino group or an unsubstituted alkoxycarbonylamino group. The alkoxycarbonylamino group has preferably 2 to 12 carbon atoms. Examples of the substituent include ionic hydrophilic groups. Examples of the alkoxycarbonylamino group include ethoxycarbonylamino group.

The term "alkyl- or aryl-sulfonylamino group" means a substituted alkylsulfonylamino group, a substituted arylsulfonylamino group, an unsubstituted alkylsulfonylamino group or an unsubstituted arylsulfonylamino group. The sulfonylamino group has preferably 1 to 12 carbon atoms. Examples of the substituent include ionic hydrophilic groups. Examples of the sulfonylamino group include methanesulfonylamino, N-phenylmethanesulfonylamino, benzenesulfonylamino and 3-carboxybenzenesulfonylamino.

The term "carbamoyl group" means a substituted carbamoyl group or an unsubstituted carbamoyl group. Examples of the substituent include alkyl groups. Examples of the carbamoyl group include methylcarbamoyl and dimethylcarbamoyl.

The term "sulfamoyl group" embraces a substituted sulfamoyl group or an unsubstituted sulfamoyl group. Examples of the substituent include alkyl groups. Examples of the sulfamoyl group include dimethylsulfamoyl and di-(2-hydroxyethyl)sulfamoyl.

The term "alkoxycarbonyl group" means a substituted alkoxycarbonyl group or an unsubstituted alkoxycarbonyl group. The alkoxycarbonyl group has preferably 2 to 12 carbon atoms. Examples of the substituent include ionic hydrophilic groups. Examples of the alkoxycarbonyl group include methoxycarbonyl and ethoxycarbonyl.

The term "acyloxy group" means a substituted acyloxy group or an unsubstituted acyloxy group. The acyloxy group has preferably 2 to 12 carbon atoms. Examples of the substituent include ionic hydrophilic groups. Examples of the acyloxy group include acetoxy and benzoyloxy.

The term "carbamoyloxy group" means a substituted carbamoyloxy group or an unsubstituted carbamoyloxy group. Examples of the substituent include alkyl groups. Examples of the carbamoyloxy group include N-methylcarbamoyloxy group.

The term "aryloxycarbonyl group" means a substituted aryloxycarbonyl group or an unsubstituted aryloxycarbonyl group. The aryloxycarbonyl group has preferably 7 to 12 carbon atoms. Examples of the substituent include ionic hydrophilic groups. Examples of the aryloxycarbonyl group include phenoxycarbonyl.

The term "aryloxycarbonylamino group" means a substituted aryloxycarbonylamino group or an unsubstituted aryloxycarbonylamino group. The aryloxycarbonylamino group has preferably 7 to 12 carbon atoms. Examples of the substituent include ionic hydrophilic groups. Examples of the aryloxycarbonylamino group include phenoxycarbonylamino.

The term "alkyl-, aryl- or heterocyclic-thio group" means a substituted alkyl-, aryl- or heterocyclic-thio group or an unsubstituted alkyl-, aryl- or heterocyclic-thio group. The alkyl-, aryl- or heterocyclic thio group has preferably 1 to 12 carbon atoms. Examples of the substituent include ionic hydrophilic groups. Examples of the alkyl-, aryl- or heterocyclic-thio group include methylthio, phenylthio and 2-pyridylthio groups.

The term "heterocyclic oxycarbonyl group" means a substituted heterocyclic oxycarbonyl group or an unsubstituted heterocyclic oxycarbonyl group. The heterocyclic oxycarbonyl group has preferably 2 to 12 carbon atoms. Examples of the substituent include ionic hydrophilic groups. Examples of the heterocyclic oxycarbonyl group include 2-pyridyloxycarbonyl.

The term "heterocyclic sulfonylamino group" means a substituted heterocyclic sulfonylamino group or an unsubstituted heterocyclic sulfonylamino group. The heterocyclic sulfonylamino group has preferably 1 to 12 carbon atoms. Examples of the substituent include ionic hydrophilic groups. Examples of the heterocyclic sulfonylamino group include 2-thiophenesulfonylamino and 3-pyridinesulfonylamino.

The term "heterocyclic sulfonyl group" means a substituted heterocyclic sulfonyl group or an unsubstituted heterocyclic sulfonyl group. The heterocyclic sulfonyl group has preferably 1 to 12 carbon atoms. Examples of the substituent include ionic hydrophilic groups. Examples of the heterocyclic sulfonyl group include 2-thiophenesulfonyl and 3-pyridinesulfonyl.

The term "heterocyclic sulfinyl group" means a substituted heterocyclic sulfinyl group or an unsubstituted heterocyclic sulfinyl group. The heterocyclic sulfinyl group has preferably 1 to 12 carbon atoms. Examples of the substituent include ionic hydrophilic groups. Examples of the heterocyclic sulfinyl group include 4-pyridinesulfinyl.

In the invention, a structure represented by the following formula (A-2) is especially preferred.

(A-2)

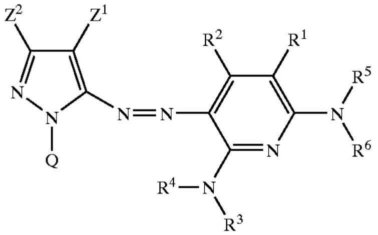

In the formula (A-2), $Z^1$ represents an electron attractive group having a Hammett substituent constant δp of 0.20 or greater. The electron attractive group represented by $Z^1$ has preferably δp of 0.30 or greater, more preferably 0.45 or greater, especially 0.60 or greater. The constant δp is however desired not to exceed 1.0. Preferred specific examples of the substituent include electron attractive substituents which will be described later. Of these, preferred are $C_{2-12}$ acyl groups, $C_{2-12}$ alkyloxycarbonyl groups, nitro group, cyano group, $C_{1-12}$ alkylsulfonyl groups, $C_{6-18}$ arylsulfonyl groups, $C_{1-12}$ carbamoyl groups, and $C_{1-12}$ alkyl halide groups, of which cyano group, $C_{1-12}$ alkylsulfonyl groups, $C_{6-18}$ arylsulfonyl groups are especially preferred, with cyano group being most preferred.

$R^1$, $R^2$, $R^5$ and $R^6$ in the formula (A-2) have the same meanings as described in the formula (A-1).

$R^3$ and $R^4$ each independently represents a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group or a sulfamoyl group. Of these, a hydrogen atom, an aromatic group, a heterocyclic group, an acyl group, an alkylsulfonyl group or an arylsulfonyl group is preferred, with a hydrogen atom, an aromatic group or a heterocyclic group being especially preferred.

$Z^2$ represents a hydrogen atom, an aliphatic group, an aromatic group or a heterocyclic group. Q represents a hydrogen atom, an aliphatic group, an aromatic group or a heterocyclic group. As Q, a group made of a nonmetal atomic group necessary for forming a 5- to 8-membered ring is preferred. The 5- to 8-membered ring may be substituted, be saturated or have an unsaturated bond. An aromatic group and a heterocyclic group are especially preferred. Preferred examples of the nonmetal atom include nitrogen atom, oxygen atom, sulfur atom and carbon atom. Specific examples of such a cyclic structure include benzene, cyclopentane, cyclohexane, cycloheptane, cyclooctane, cyclohexene, pyridine, pyrimidine, pyrazine, pyridazine, triazine, imidazole, benzimidazole, oxazole, benzoxazole, thiazole, benzothiazole, oxane, sulfolane and thiane rings.

Each of the groups as described in the formula (A-2) may have a substituent further. When they have a substituent, substituents as described in the formula (A-1), groups exemplified in G, $R^1$, or $R^2$, and ionic hydrophilic groups can be mentioned by way of example.

A description will next be made of a Hammett substituent constant σp value used herein. The Hammett rule is an empirical rule suggested by L. P. Hammett in 1935 in order to deal quantitatively with the influence of substituents on reactions or equilibria of benzene derivatives, and nowadays its validity is widely accepted. The substituent constants determined by the Hammett rule include σp values and σm values, many of which are described in general books and are described in detail, for example, in "Lange's Handbook of Chemistry," 12th edition, ed. by J. A. Dean, published in 1979 (McGraw-Hill), and in "Journal of Japanese Chemistry", Extra Number, No. 122, pages 96 to 103, 1979 (Nankodo Co., Ltd.). In the present invention, each substituent is stipulated by the Hammett substituent constant σp values. It is however needless to say that substituents are not limited by these values which are known and described in literature in these books but rather the present invention includes substituents whose Hammett substituent constant up values are not known in the literature but when measured in accordance with the Hammett rule, fall within its range. The compounds represented by the formulas (A-1) and (A-2) of the invention are not always benzene derivatives, but σp values are used as a measure for indicating electron effects of the substituent irrespective of the position of the substituent. In the invention, σp values are used in this sense.

Examples of electron attractive groups having an Hammett substituent constant σp value of 0.60 or greater include cyano group, nitro group, alkylsulfonyl groups (such as methanesulfonyl) and arylsulfonyl groups (such as benzenesulfonyl).

Examples of electron attractive groups having an Hammett substituent constant σp value of 0.45 or greater include acyl groups (such as acetyl), alkoxycarbonyl groups (such as dodecyloxycarbonyl), aryloxycarbonyl groups (such as m-chlorophenoxycarbonyl), alkylsulfinyl groups (such as n-propylsulfinyl), arylsulfinyl groups (ex. phenylsulfinyl), sulfamoyl groups (such as N-ethylsulfamoyl and N,N-dimethylsulfamoyl), and alkyl halilde groups (such as trifluoromethyl).

Examples of the electron attractive groups with a σp value of 0.30 or greater include, in addition to the above-described groups, acyloxy groups (such as acetoxy), carbamoyl groups (such as N-ethylcarbamoyl and N,N-dibutylcarbamoyl), halogenated alkoxy groups (such as trifluoromethyloxy), halogenated aryloxy groups (such as pentafluorophenyloxy), sulfonyloxy groups (ex. methylsulfonyloxy), halogenated alkylthio groups (such as difluoromethylthio), aryl groups substituted with at least two electron attractive groups having a σp value4 of 0.15 or greater (such as 2,4-dinitrophenyl and pentachlorophenyl) and heterocycles (such as 2-benzoxazolyl, 1-benzothiazolyl and 1-phenyl-2-benzimidazolyl). Specific examples of the electron attractive group having a σp value of 0.20 or greater include, in addition to the above-described ones, halogen atoms.

The azo dyes of the formula (A-1) having, as $B^1$ and $B^2$, $—CR^1=$ and $—CR^2=$, respectively, and, as each of $R^1$ and $R^2$, a hydrogen atom, a halogen atom, a cyano group, a carbamoyl group, a carboxyl group, an alkyl group, a hydroxy group or an alkoxy group, more preferably a hydrogen atom, a cyano group, a carbamoyl group or an alkoxy group are especially preferred.

As G, preferred are a hydrogen atom, halogen atoms, alkyl groups, a hydroxyl group, an amino group and amide groups, of which a hydrogen atom, halogen atoms, an amino group and amide groups are more preferred, with a hydrogen atom, an amino group and amide groups being still more preferred.

As A, preferred are pyrazole, imidazole, isothiazole, thiadiazole and benzothiazole rings, of which pyrazole and isothiazole rings are more preferred, with pyrazole ring being most preferred.

As $R^5$ and $R^6$, preferred are a hydrogen atom, alkyl groups, aryl groups, heterocyclic groups, a sulfonyl group and acyl groups, of which a hydrogen atom, aryl groups, heterocyclic groups and a sulfonyl group are preferred, with a hydrogen atom, aryl groups and heterocyclic groups being most preferred. $R^5$ and $R^6$ however do not represent a hydrogen atom simultaneously.

As the compound of the formula (A-1), those having, as at least one of the substituents, the above-described preferred group are preferred, of which those having, as more substituents, the above-described preferred groups are more preferred, with those having, as all the substituents, the above-described preferred groups being most preferred.

Specific examples of the azo dye of the formula (A-1) will be described below, but azo dyes used in the invention are not limited thereto.

TABLE 1

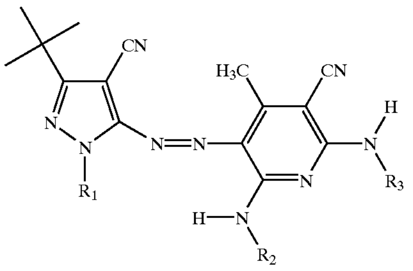

| Dye | $R_1$ | $R_2$ | $R_3$ |
|---|---|---|---|
| a-1 | 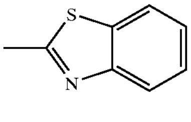 | 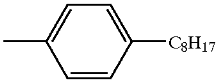 | 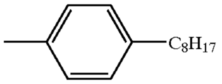 |

TABLE 1-continued
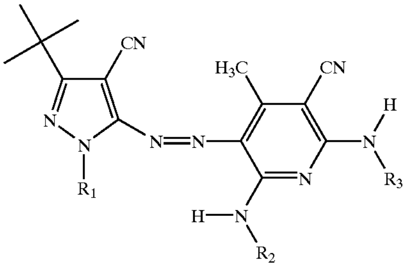
| Dye | $R_1$ | $R_2$ | $R_3$ |
|---|---|---|---|
| a-2 | 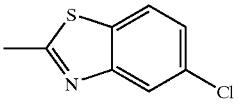 | 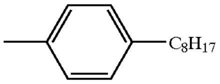 | 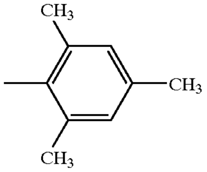 |
| a-3 | 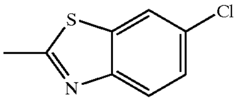 | 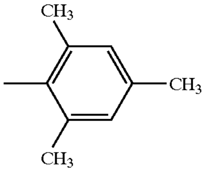 | 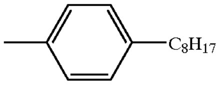 |
| a-4 | 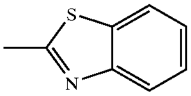 | 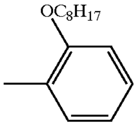 | 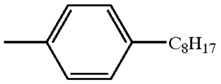 |
| a-5 | 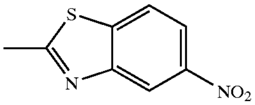 | 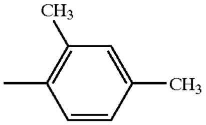 | 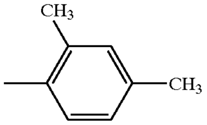 |
TABLE 2
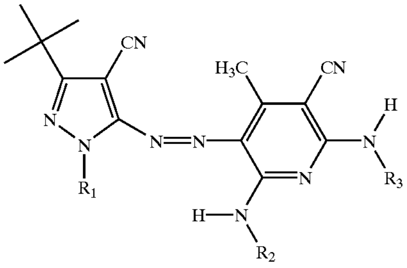
| Dye | $R_1$ | $R_2$ | $R_3$ |
|---|---|---|---|
| a-6 | 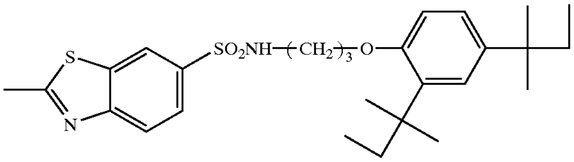 | 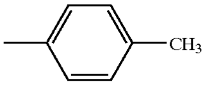 | 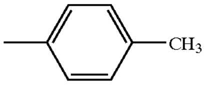 |

TABLE 2-continued
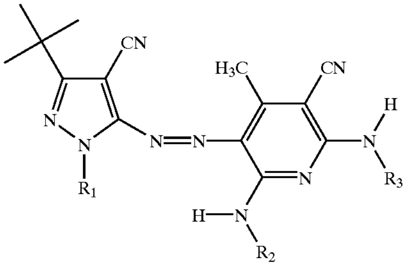
| Dye | $R_1$ | $R_2$ | $R_3$ |
|---|---|---|---|
| a-7 | 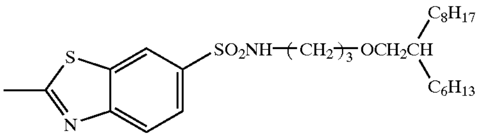 | 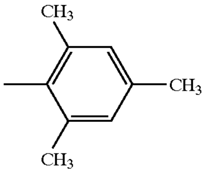 | 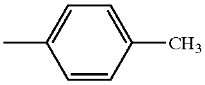 |
| a-8 | 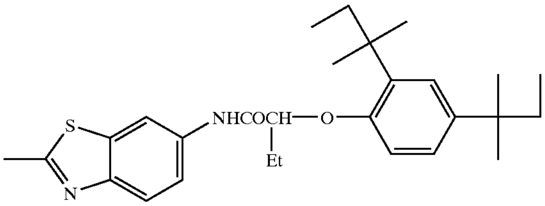 | 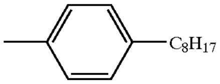 | 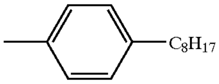 |
| a-9 | 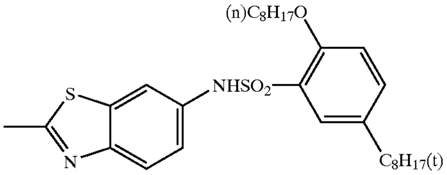 | 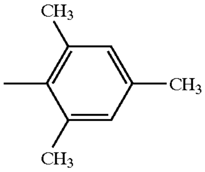 | $C_8H_{17}(t)$ |
| a-10 | 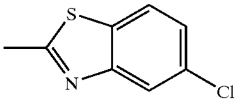 | 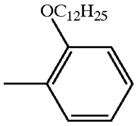 | 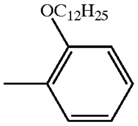 |
TABLE 3
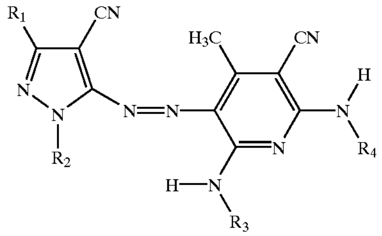
| Dye | $R_1$ | $R_2$ | $R_3$ | $R_4$ |
|---|---|---|---|---|
| a-11 | 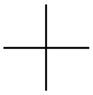 | 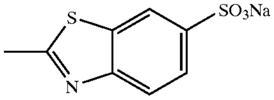 | 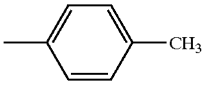 | 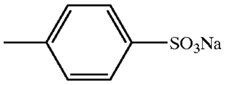 |

TABLE 3-continued
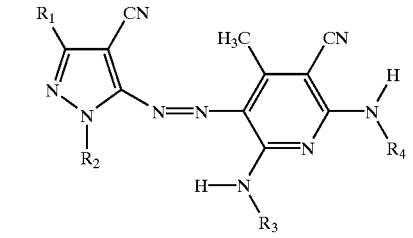
| Dye | $R_1$ | $R_2$ | $R_3$ | $R_4$ |
|---|---|---|---|---|
| a-12 | 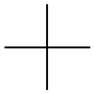 | 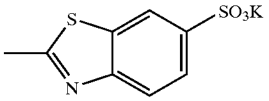 | 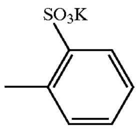 | 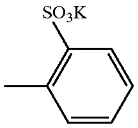 |
| a-13 | 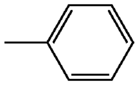 | 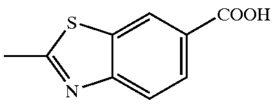 | 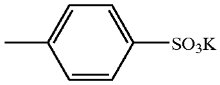 | 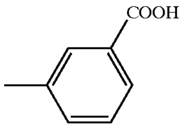 |
| a-14 | 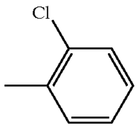 | 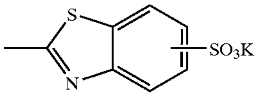 (4,5-mix) | 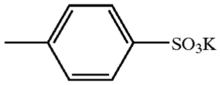 | 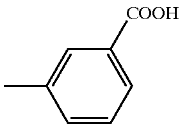 |
| a-15 | 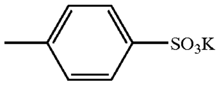 | 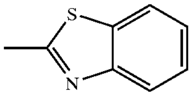 | 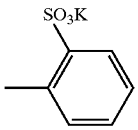 | 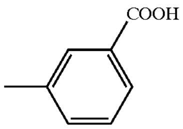 |
TABLE 4
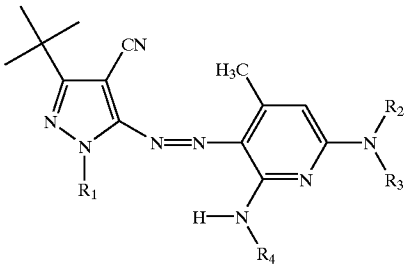
| Dye | $R_1$ | $R_2$ | $R_3$ | $R_4$ |
|---|---|---|---|---|
| a-16 | 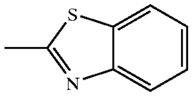 | 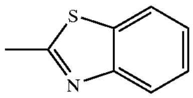 | 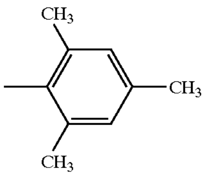 | 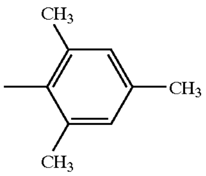 |

TABLE 4-continued
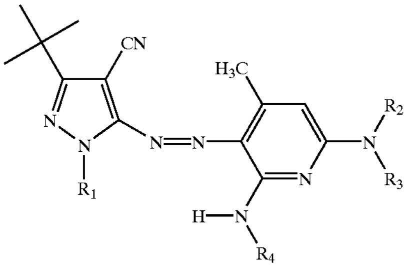
| Dye | $R_1$ | $R_2$ | $R_3$ | $R_4$ |
|---|---|---|---|---|
| a-17 | 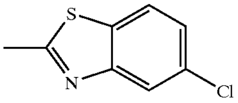 | $—SO_2CH_3$ | 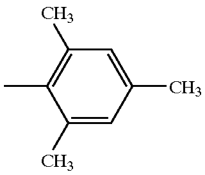 | 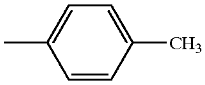 |
| a-18 | 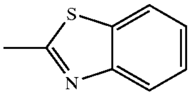 | $—COCH_3$ | $C_8C_{17}$(t) | $C_8H_{17}$(t) |
| a-19 | 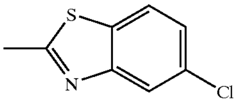 | 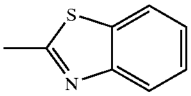 | 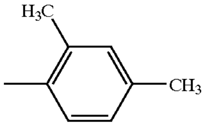 | 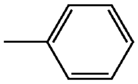 |
| a-20 | 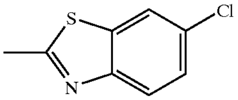 | $—SO_2CH_3$ | 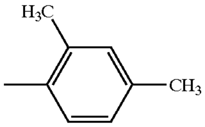 | $C_8H_{17}$(t) |
TABLE 5
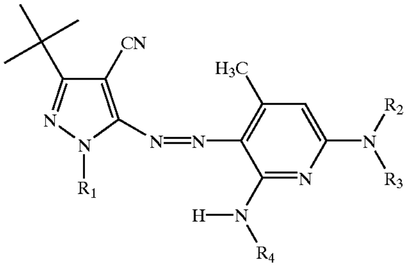
| Dye | $R_1$ | $R_2$ |
|---|---|---|
| a-21 | 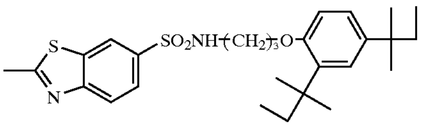 | 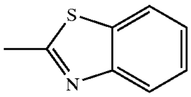 |
| a-22 | 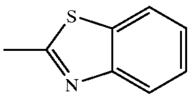 | 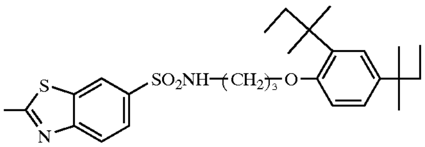 |

TABLE 5-continued
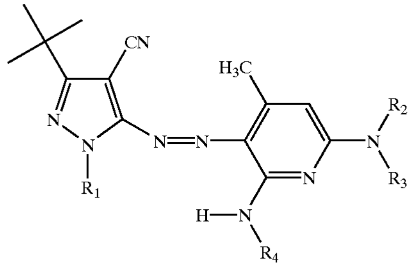
| | | |
|---|---|---|
| a-23 | 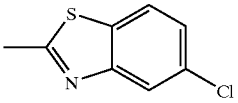 | 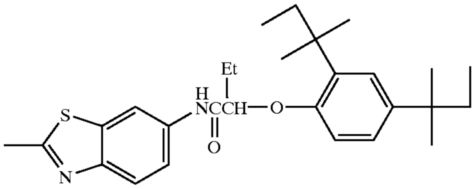 |
| a-24 | 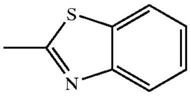 | 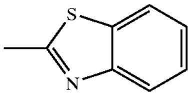 |
| a-25 | 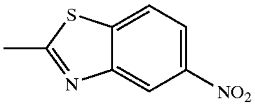 | 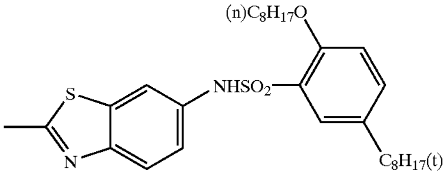 |
| Dye | $R_3$ | $R_4$ |
|---|---|---|
| a-21 | 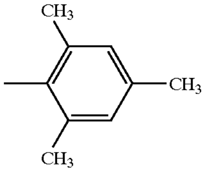 | 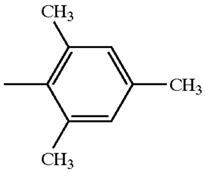 |
| a-22 | 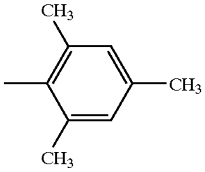 | 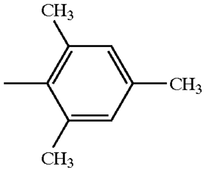 |
| a-23 | 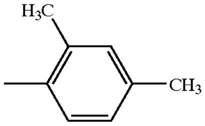 | 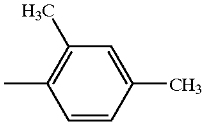 |
| a-24 | 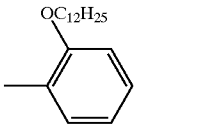 | 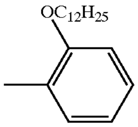 |
| a-25 | 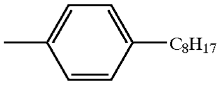 | $C_8H_{17}(t)$ |

TABLE 6
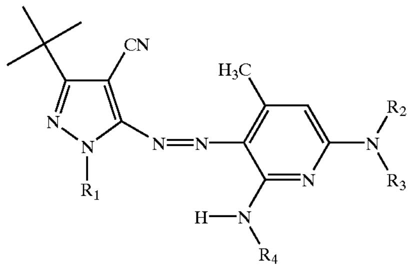
| Dye | $R_1$ | $R_2$ |
| --- | --- | --- |
| a-26 | 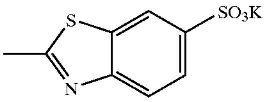 | 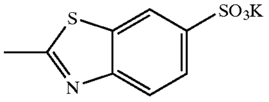 |
| a-27 | 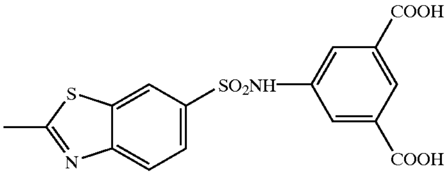 | 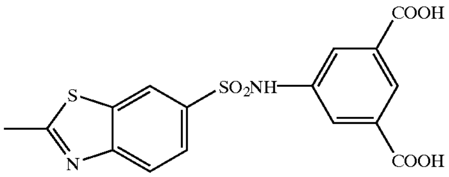 |
| a-28 | 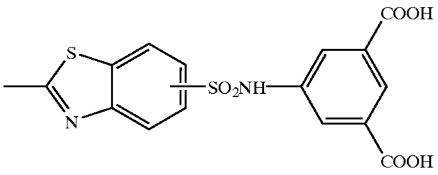 (5,6-mix) | 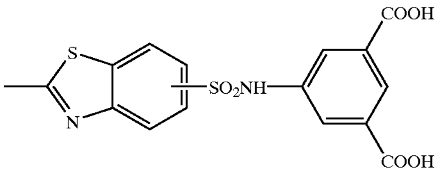 (5,6-mix) |
| a-29 | 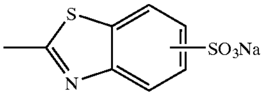 (5,6-mix) | 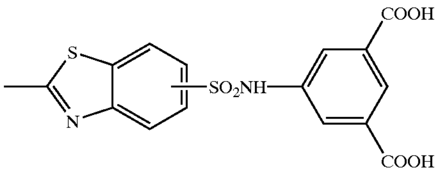 (5,6-mix) |
| Dye | $R_3$ | $R_4$ |
| --- | --- | --- |
| a-26 | 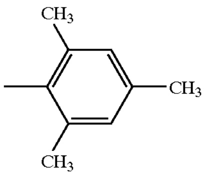 | 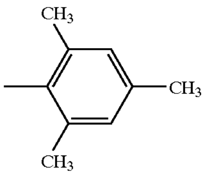 |
| a-27 | 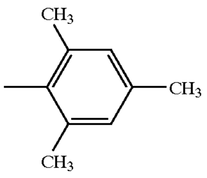 | 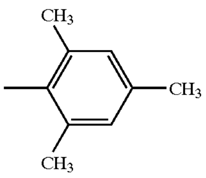 |

TABLE 6-continued
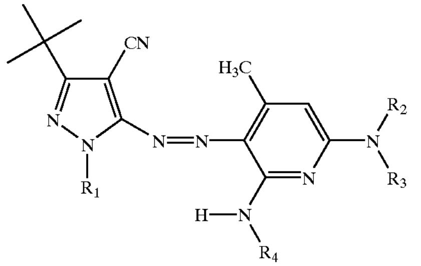
| | | |
|---|---|---|
| a-28 | 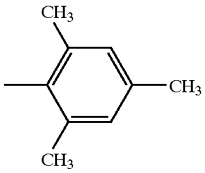 | 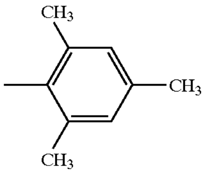 |
| a-29 | 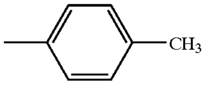 | 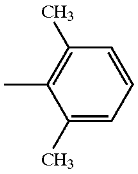 |
TABLE 7
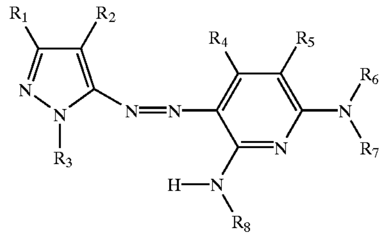
| Dye | $R_1$ | $R_2$ | $R_3$ | $R_4$ | $R_5$ | $R_6$ | $R_7$ | $R_8$ |
|---|---|---|---|---|---|---|---|---|
| a-30 | 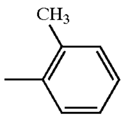 | CN | 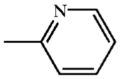 | H | $CONH_2$ | $SO_2CH_3$ | 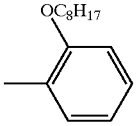 | 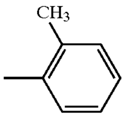 |
| a-31 | 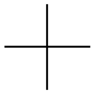 | Br | 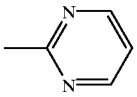 | COOEt | H | 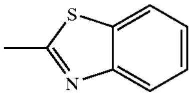 | $C_8H_{17}(t)$ | $COCH_3$ |
| a-32 | 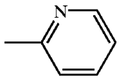 | $SO_2CH_3$ | 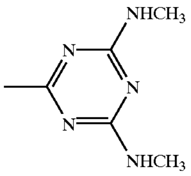 | $CONH_2$ | H | 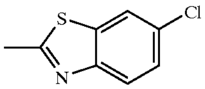 | 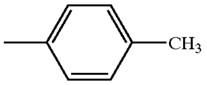 | 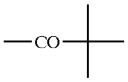 |

TABLE 7-continued
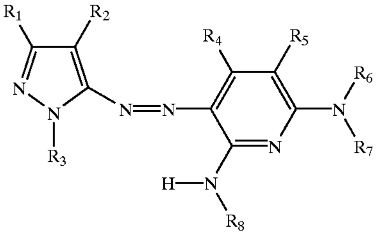
| Dye | $R_1$ | $R_2$ | $R_3$ | $R_4$ | $R_5$ | $R_6$ | $R_7$ | $R_8$ |
|---|---|---|---|---|---|---|---|---|
| a-33 | 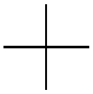 | CN | 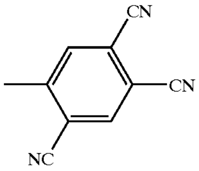 | H | H | 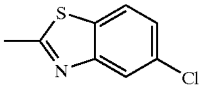 | 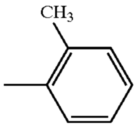 | $SO_2CH_3$ |
TABLE 8
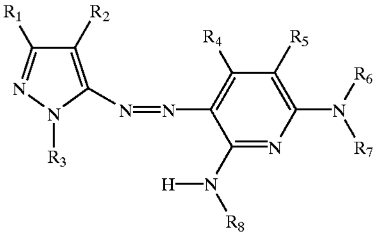
| Dye | $R_1$ | $R_2$ | $R_3$ | $R_4$ | $R_5$ | $R_6$ | $R_7$ | $R_8$ |
|---|---|---|---|---|---|---|---|---|
| a-34 | 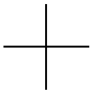 | Br | 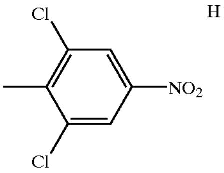 | H | $CONH_2$ | 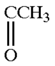 | 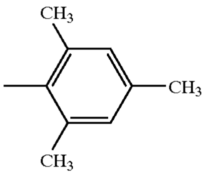 | 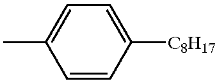 |
| a-35 | 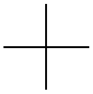 | CN | 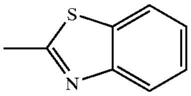 | $CH_3$ | H | 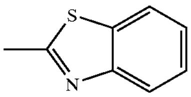 | 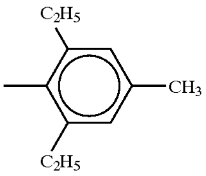 | 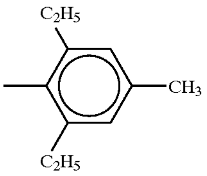 |
| a-36 | 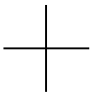 | CN | 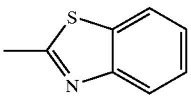 | $CH_3$ | CN | H | 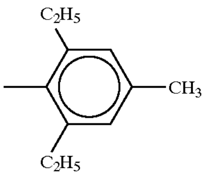 | 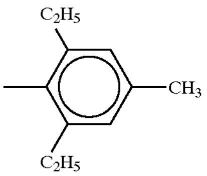 |

TABLE 9
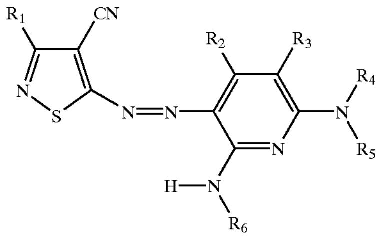
| Dye | $R_1$ | $R_2$ | $R_3$ | $R_4$ | $R_5$ | $R_6$ |
|---|---|---|---|---|---|---|
| b-1 | $CH_3$ | $CH_3$ | CN | H | 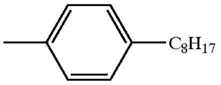 | 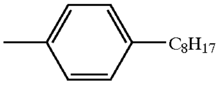 |
| b-2 | $CH_3$ | $CH_3$ | CN | H | 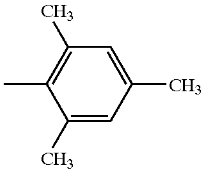 | 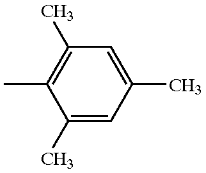 |
| b-3 | $CH_3$ | $CH_3$ | $CONH_2$ | H | 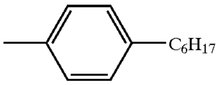 | 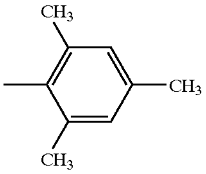 |
| b-4 | $CH_3$ | $CH_3$ | H | H | 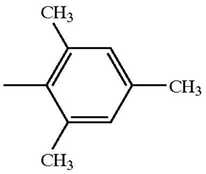 | 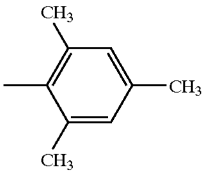 |
| b-5 | $CH_3$ | H | CN | H | 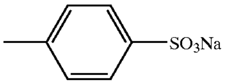 | 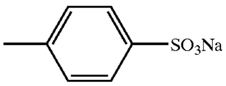 |
TABLE 10
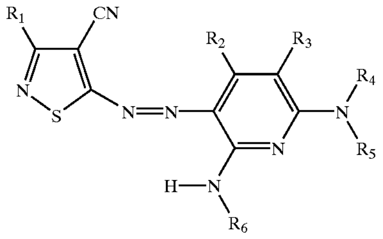
| Dye | $R_1$ | $R_2$ | $R_3$ | $R_4$ | $R_5$ | $R_6$ |
|---|---|---|---|---|---|---|
| b-6 | $CH_3$ | $CH_3$ | H | 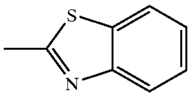 | 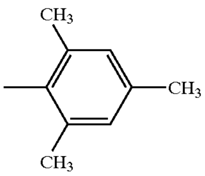 | 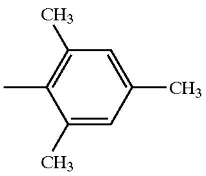 |

TABLE 10-continued
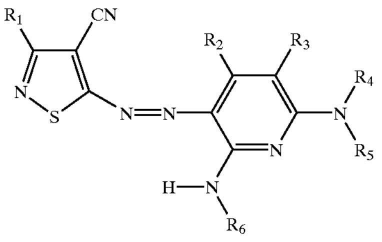
| Dye | $R_1$ | $R_2$ | $R_3$ | $R_4$ | $R_5$ | $R_6$ |
|---|---|---|---|---|---|---|
| b-7 | $CH_3$ | $CH_3$ | H | 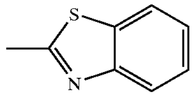 | 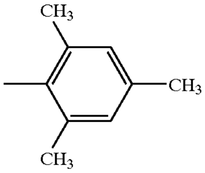 | 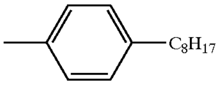 |
| b-8 | $CH_3$ | H | H | $SO_2CH_3$ | 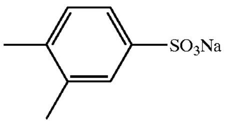 | 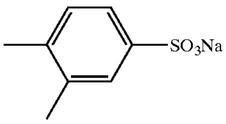 |
TABLE 11
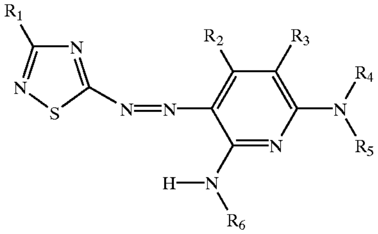
| Dye | $R_1$ | $R_2$ | $R_3$ | $R_4$ | $R_5$ | $R_6$ |
|---|---|---|---|---|---|---|
| c-1 | $—SCH_3$ | $CH_3$ | CN | H | $C_8H_{17}(t)$ | 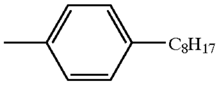 |
| c-2 | 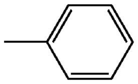 | H | $CONH_2$ | H | 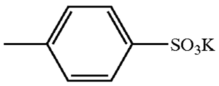 | 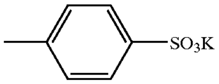 |
| c-3 | 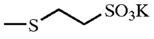 | $CH_3$ | H | 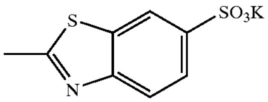 | 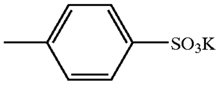 | 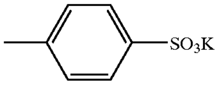 |
| c-4 | $—CH_3$ | $CH_3$ | H | 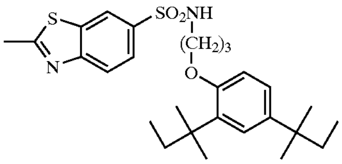 | 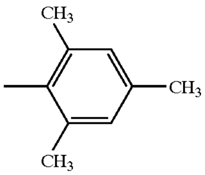 | 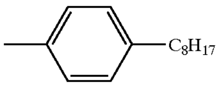 |

TABLE 11-continued
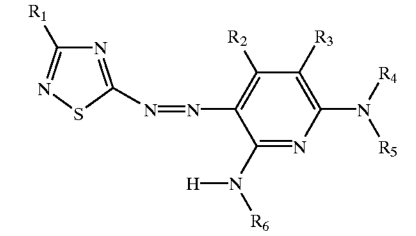
| Dye | $R_1$ | $R_2$ | $R_3$ | $R_4$ | $R_5$ | $R_6$ |
|---|---|---|---|---|---|---|
| c-5 | 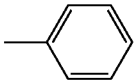 | H | H | 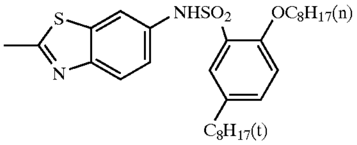 | 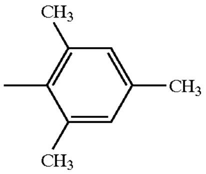 | $C_8H_{17}$(t) |
TABLE 12
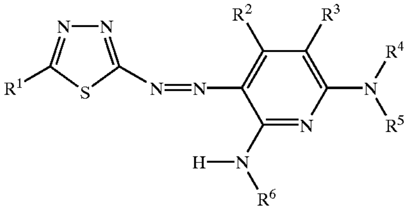
| Dye | $R_1$ | $R_2$ | $R_3$ | $R_4$ | $R_5$ | $R_6$ |
|---|---|---|---|---|---|---|
| d-1 | Me | $CH_3$ | CN | H | 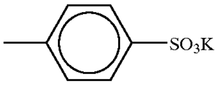 | 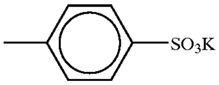 |
| d-2 | Me | $CH_3$ | CN | H | 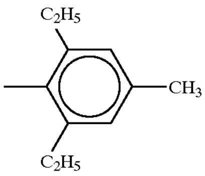 | 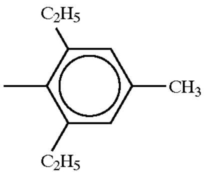 |
| d-3 | Me | H | H | 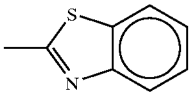 | 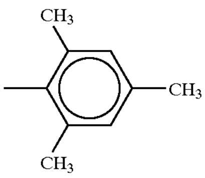 | 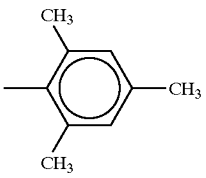 |
| d-4 | Ph | $CH_3$ | $CONH_2$ | H | 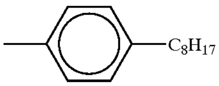 | 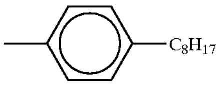 |

TABLE 12-continued
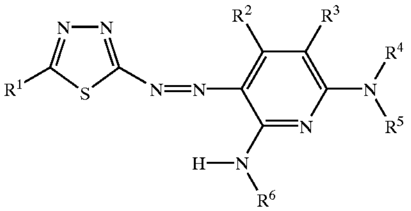
| Dye | $R_1$ | $R_2$ | $R_3$ | $R_4$ | $R_5$ | $R_6$ |
|---|---|---|---|---|---|---|
| d-5 | Ph | $CH_3$ | H | 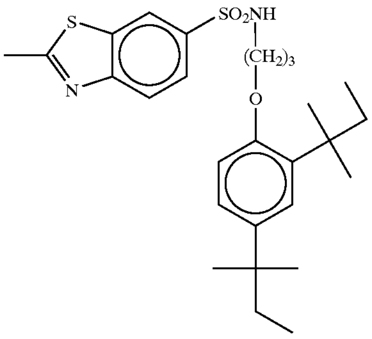 | 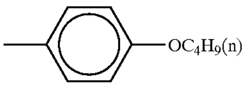 | 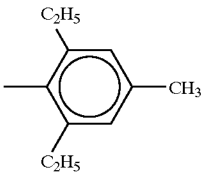 |
TABLE 13
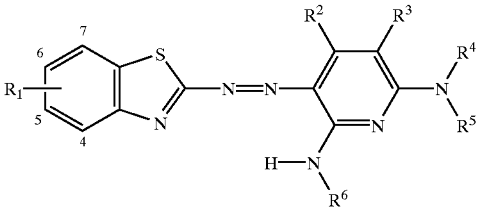
| Dye | $R_1$ | $R_2$ | $R_3$ | $R_4$ | $R_5$ | $R_6$ |
|---|---|---|---|---|---|---|
| e-1 | 5-Cl | $CH_3$ | $CONH_2$ | H | $C_8H_{17}$(t) | $C_8H_{17}$(t) |
| e-2 | 5,6-diCl | H | H | 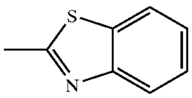 | 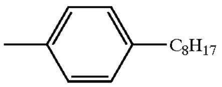 | 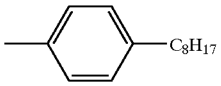 |
| e-3 | 5,6-diCl | $CH_3$ | H | 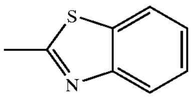 | 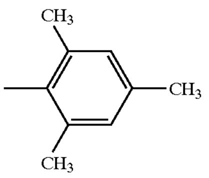 | $COCH_3$ |
| e-4 | 5-$CH_3$ | H | CN | H | 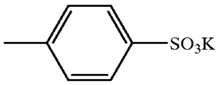 | 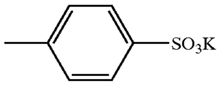 |
| e-5 | 5-$NO_2$ | $CH_3$ | H | $SO_2CH_3$ | 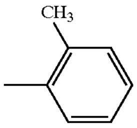 | 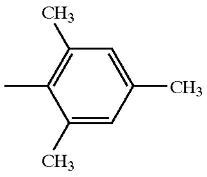 |

The inkjet recording ink compositions of the invention each contains the azo dye preferably in an amount of 0.1 to 20% by mass, more preferably 0.2 to 15% by mass.

The inkjet recording ink composition of the invention may contain another dye in combination with the azo dye in order to adjust the color tone for obtaining a full-color image. The dyes usable in combination will next be described.

As yellow dyes, any desired one can be employed. Examples include aryl or heterylazo dyes having, as a coupling component, a phenol, naphthol, aniline, pyrazolone, pyridone, or open-chain type active methylene compound; azomethine dyes having an open-chain active methylene compound as a coupling component; methine dyes such as benzylidene and monomethineoxonol dyes; quinone dyes such as naphthoquinone and anthraquinone dyes; and other dyes such as quinophthalone, nitro-nitroso, acridine and acridinone dyes.

As magenta dyes, any desired one is usable in the invention. Examples include aryl or heterylazo dyes having a phenol, naphthol or aniline as a coupling component; azomethine dyes having a pyrazolone or pyrazolotriazole as a coupling component; methine dyes such as arylidene, styryl, merocyanine, and oxonol dyes; carbonium dyes such as diphenylmethane, triphenylmethane and xanthene dyes; quinone dyes such as naphthoquinone, anthraquinone and anthrapyridone dyes; and condensed polycyclic dyes such as dioxazine dyes.

As cyan dyes, any desired one is usable in the invention. Examples include indoaniline dyes, indophenol dyes and azomethine dyes having pyrrolotriazole as a coupling component; polymethine dyes such as cyanine, oxonol and merocyanine dyes; carbonium dyes such as diphenylmethane, triphenylmethane and xanthene dyes; phthalocyanine dyes; anthraquinone dyes; aryl or heterylazo dyes having a phenol, naphthol or aniline as a coupling component; and indigo-thioindigo dyes.

Each of the above-exemplified dyes may assume each of yellow, magenta and cyan colors for the first time after dissociation of a portion of its chromophore. In this case, a counter cation may be either an inorganic cation such as alkali metal or ammonium or an organic cation such as pyridinium or quaternary ammonium salt. Alternatively, it may be a polymer cation having, in its partial structure, such a cation.

Preferred is the use of pigments formed by the reaction between the below-described yellow, magenta and cyan couplers with the oxidized product of an aromatic primary amine developing agent.

Yellow couplers: Couplers as described in U.S. Pat. Nos. 3,933,501, 4,022,620, 4,326,024, 4,401,752 and 4,248,961, Japanese Patent Publication No. 10739/1983, British Patent Nos. 1,425,020 and 1,476,760, U.S. Pat. Nos. 3,973,968, 4,314,023 and 4,511,649, and European Patent No. 249, 473A, couplers represented by the formula (I) or (II) of European Patent No. 502,424A, couplers represented by the formula (1) or (2) of European Patent No. 513,496A (particularly, Y-28 on page 18), couplers represented by the formula (I) of claim 1 of European Patent No. 568,037A, couplers represented by the formula (I), lines 45 to 55, column 1 of U.S. Pat. No. 5,066,576, couplers represented by the formula (I) in [0008] of Japanese Patent Laid-Open No. 274425/1992, couplers as described in claim 1 on page 40 of European Patent No. 498,381A1 (particularly, D-35 on page 18), couplers represented by the formula (Y) on page 4 of European Patent No. 447,969A1 (particularly, Y1 (on page 17), Y-54 (page 41)) and couplers represented by the formulas (II) to (IV), lines 36 to 58, column 7 of U.S. Pat. No. 4,476,219 [particularly, II-17 and 19 (column 17), and II-24 (column 19)].

Magenta couplers: Couplers as described in U.S. Pat. Nos. 4,310,619 and 4,351,897, European Patent No. 73,636, U.S. Pat. Nos. 3,061,432 and 3,725,067, Research Disclosure Nos. 24220 (June, 1984) and 24230 (June, 1984), Japanese Patent Laid-Open Nos. 33552/1985, 43659/1985, 72238/1986, 35730/1988, 118034/1980 and 185951/1985, U.S. Pat. Nos. 4,500,630, 4,540,654 and 4,556,630, World IPO WO88/04795, Japanese Patent Laid-Open No.39737/1991 [L-57 (right bottom on page 11), L-68 (right bottom on page 12) and L-77 (right bottom on page 13)], European Patent Nos. 456,257 [[A-4]-63 (page 134), [A-4]-73, -75 (page 139)], 486,965 {[M-4, -6] (page 26), M-7 (page 27)) and 571,959A ([M-45] (page 19)}, Japanese Patent Laid-Open No. 204106/1983 ((M-1) (page 6)), and No. 362631/1992 (M-22 of [0237]), and U.S. Pat. Nos. 3,061,432 and 3,725, 067.

Cyan couplers: U.S. Pat. Nos. 4,052,212, 4,146,396, 4,228,233 and 4,296,200, European Patent No. 73,636, Japanese Patent Laid-Open 204843/1992 [CX-1, 3, 4, 5, 11, 12, 13, 15 (pages 14 to 16)], Japanese Patent Laid-Open No. 43345/1992 [C-7,10 (page 35), 34,35 (page 37), (I-1), (I-17) (pages 42 to 43)] and a coupler represented by the formula (Ia) or (Ib) of claim 1 of Japanese Patent Laid-Open No. 67385/1994.

In the next place, compounds represented by the formula (I) will be described.

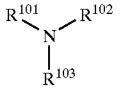

(I)

In the formula (I), $R^{101}$ and $R^{102}$ each represents a hydrogen atom, an aliphatic group (such as methyl, ethyl, t-butyl, octyl or methoxyethoxy), an aromatic group (such as phenyl, p-chlorophenyl or naphthyl), a heterocyclic group (such as 2-pyridyl, 4-pyridyl, 1-piperidino or 1-morpholino), an acyl group (such as acetyl, pivaloyl, methacryloyl, or benzoyl), aliphatic oxycarbonyl group (such as methoxycarbonyl or hexadecyloxycarbonyl), an aromatic oxycarbonyl group (such as phenoxycarbonyl), an aliphatic sulfonyl group (such as methanesulfonyl or butanesulfonyl), an aromatic sulfonyl group (such as benzenesulfonyl or p-toluenesulfonyl), a substituted or unsubstituted carbamoyl group (such as carbamoyl, N-methylcarbamoyl or N-phenylcarbamoyl), or a substituted or unsubstituted thiocarbamoyl group (such as thiocarbamoyl, N-methylthiocarbamoyl or N-phenylthiocarbamoyl).

$R^{103}$ represents an aliphatic group (such as methyl, ethyl, t-butyl, octyl or methoxyethoxy), an aromatic group (such as phenyl, p-chlorophenyl or naphthyl), an aliphatic oxy group (such as methoxy or octyloxy), an aromatic oxy group (such as phenoxy or p-methoxyphenoxy), an aliphatic thio group (such as methylthio or octylthio), an aromatic thio (such as phenylthio or p-methoxyphenylthio), an acyloxy group (such as acetoxy, pivaloyloxy or p-chlorobenzoyl), an aliphatic oxycarbonyloxy group (such as methoxycarbonyloxy or octyloxycarbonyloxy), an aromatic oxycarbonyloxy group (such as phenoxycarbonyloxy), a substituted or unsubstituted amino group (such as an amino group substituted with an aliphatic group, an aromatic group, an acyl group, an aliphatic sulfonyl group or an aromatic sulfonyl group), a heterocyclic group (such as 2-pyridyl, 4-pyridyl, 1-piperidino or 1-morpholino) or hydroxy group.

If possible, any of a pair $R^{101}$ and $R^{102}$, a pair $R^{102}$ and $R^{103}$, and a pair $R^{103}$ and $R^{101}$ may be coupled together to form a 5- to 7-membered ring (such as piperidine or pyrazolidine) with the proviso that the ring thus formed is not a 2,2,6,6-tetraalkylpiperidine skeleton.

These substituents may be substituted further with, for example, a halogen atom, an alkyl group (such as cycloalkyl or bicycloalkyl), an alkenyl group (such as cycloalkenyl or bicycloalkenyl), an alkynyl group, an aryl group, a heterocyclic group, a cyano group, a hydroxyl group, a nitro group, a carboxyl group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an acylamino group, an aminocarbonylamino group, an alkoxycarbonylamino group, an aryloxycarbonylamino group, a sulfamoylamino group, an alkyl- or aryl-sulfonylamino group, a mercapto group, an alkylthio group, an arylthio group, a heterocyclic thio group, a sulfamoyl group, a sulfo group, an alkyl- or aryl-sulfinyl group, an alkyl- or aryl-sulfonyl group, an acyl group, an aryloxycarbonyl group, an alkoxycarbonyl group, a carbamoyl group, an aryl or heterocyclic azo group, an imido group, a phosphino group, a phosphinyl group, a phosphinyloxy group, a phosphinylamino group or a silyl group.

The compounds of the invention represented by the formula (I) embrace compounds of the formula (I) as described in Japanese Patent Publication No. 97332/1994, compounds of the formula (I) as described in Japanese Patent Publication No. 97334/1994, compounds of the formula (I) as described in Japanese Patent Laid-Open No. 148037/1990, compounds of the formula (I) as described in Japanese Patent Laid-Open No. 150841/1990, compounds of the formula (I) as described in Japanese Patent Laid-Open No. 181145/1990, compounds of the formula (I) as described in Japanese Patent Laid-Open No. 266836/1991, compounds of the formula (IV) as described in Japanese Patent Laid-Open No. 350854/1992, and compounds of the formula (I) as described in Japanese Patent Laid-Open No. 61166/1993.

As the compounds of the formula (I), compounds of the formulas (1A) and (1B) are preferred in consideration of their effects.

(1A)

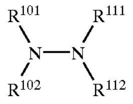

(1B)

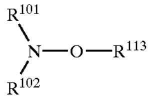

In each of the formulas (1A) and (1B), $R^{101}$ and $R^{102}$ have the same meanings as defined above in the formula (I). $R^{111}$ to $R^{113}$ have the same meanings as described as $R^{101}$.

In the formula (IA), $R^{101}$ and $R^{102}$ each preferably represents a hydrogen atom, an aliphatic group, an aromatic group, of which an aliphatic group or an aromatic group is more preferred. $R^{111}$ and $R^{112}$ each preferably represents a hydrogen atom, an acyl group, an aliphatic oxycarbonyl group, an aromatic oxycarbonyl group, a sulfonyl group, a substituted or unsubstituted carbamoyl group, or a substituted or unsubstituted thiocarbamoyl group, with a hydrogen atom, an acyl group, a sulfonyl group, a substituted or unsubstituted carbamoyl group or a substituted or unsubstituted thiocarbamoyl group being more preferred.

In the formula (IB), $R^{101}$ represents preferably an aliphatic group, an aromatic group, a heterocyclic group, an acyl group, an aliphatic sulfonyl group or an aromatic sulfonyl group, with an aliphatic group, a heterocyclic group or an acyl group being more preferred. $R^{102}$ represents preferably a hydrogen atom, an aliphatic group or an aromatic group, with a hydrogen atom or an aliphatic group being more preferred. $R^{113}$ represents preferably a hydrogen atom, an aliphatic group, an aromatic group, a heterocyclic group or an acyl group, with a hydrogen atom or an aliphatic group being more preferred.

Compounds of the formula (IA) can be synthesized by alkylation, acylation, sulfonylation or carbamoylation of a hydrazine derivative. Compounds of the formula (IB), on the other hand, can be synthesized by alkylation or acylation of a hydroxylamine derivative.

Specific examples of the compounds represented by the formula (I) will be described next, but they are not limited thereto.

(I-1)

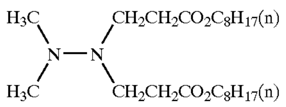

(I-2)

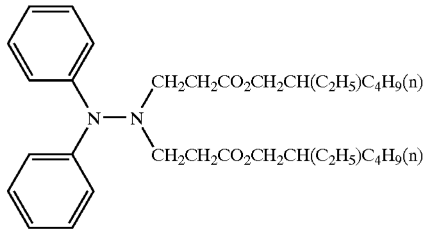

(I-3)

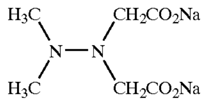

(I-4)

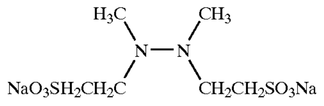

(I-11)

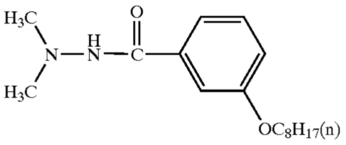

(I-12)

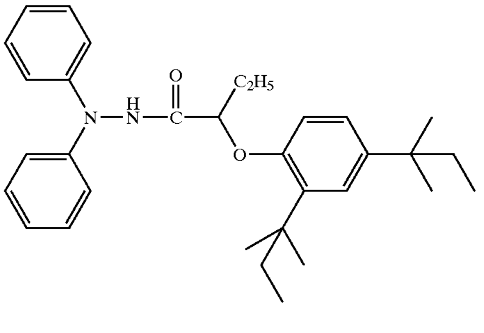

-continued
(I-13)
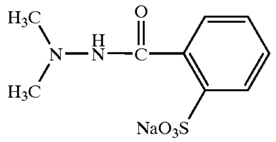
(I-14)
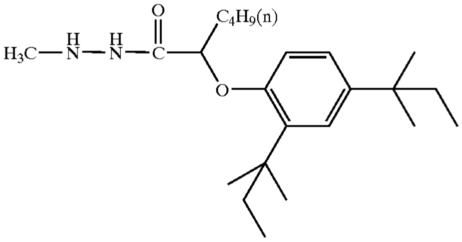
(I-15)
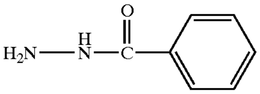
(I-16)
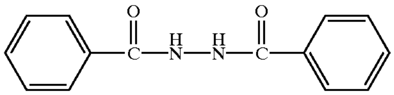
(I-21)
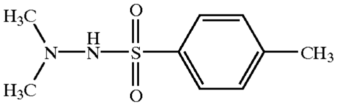
(I-22)
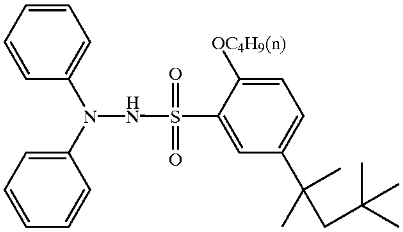
(I-23)
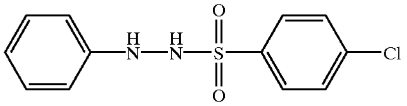
(I-24)
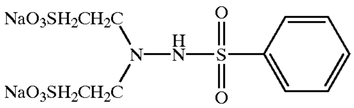
(I-25)
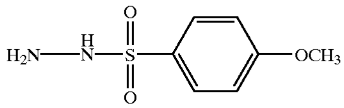
(I-31)
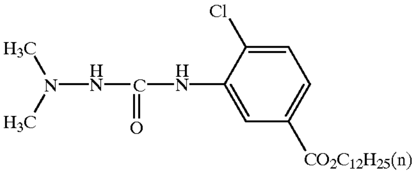
-continued
(I-32)
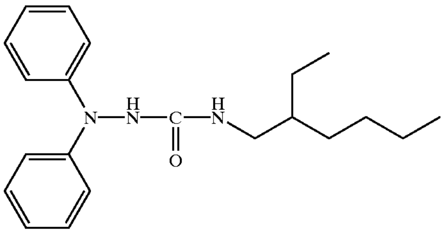
(I-33)
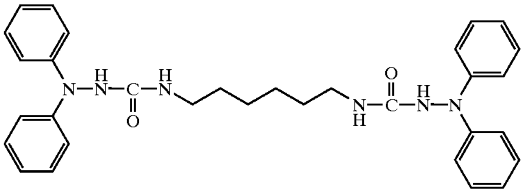
(I-34)
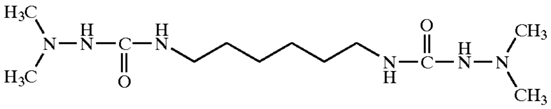
(i-35)
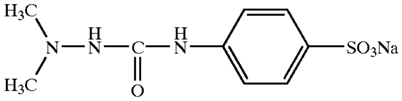
(I-36)
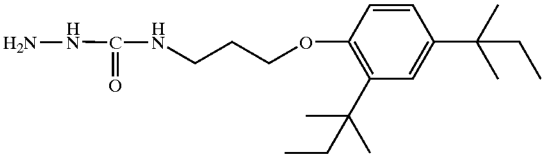
(I-37)
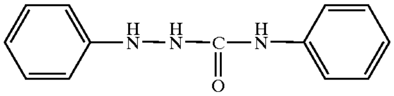
(I-38)
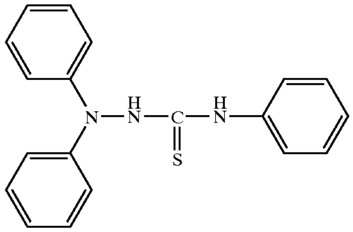
(I-39)
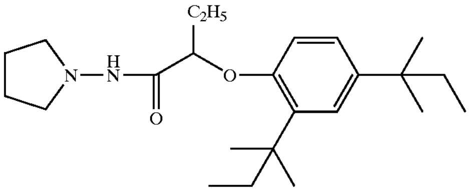

-continued
(I-40)
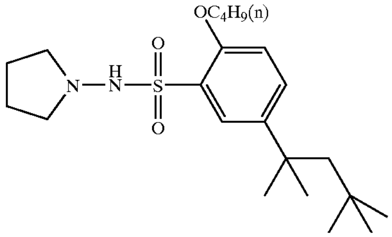
(I-41)
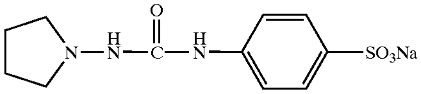
(I-42)
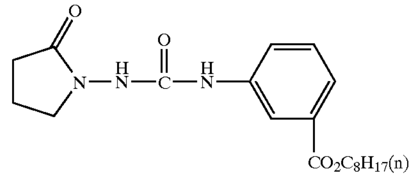
(I-43)
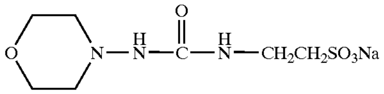
(I-44)
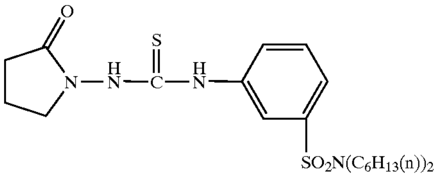
(I-51)
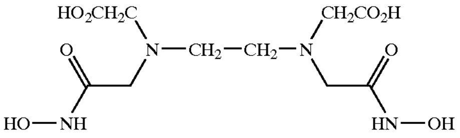
(I-52)
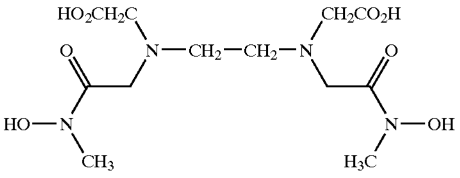
(I-53)
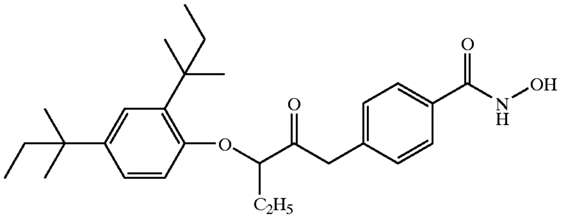
(I-54)
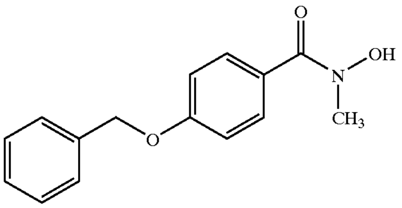
-continued
(I-55)
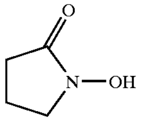
(I-56)
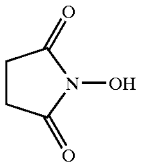
(I-57)
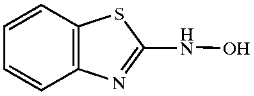
(I-58)
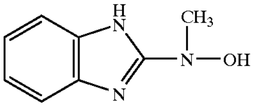
(I-59)
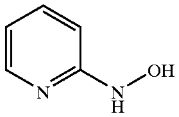
(I-60)
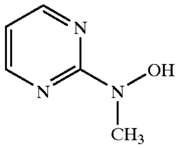
(I-61)
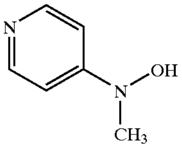
(I-62)
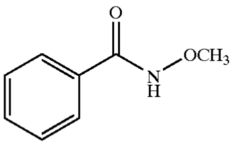
(I-63)
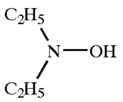
(I-64)
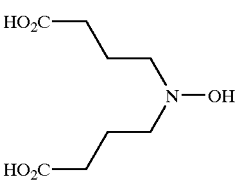
(I-65)
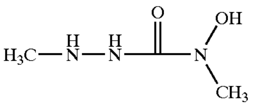

-continued
(I-66)
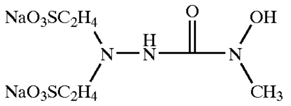
(I-67)
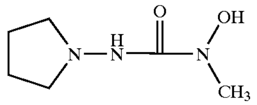
(I-68)
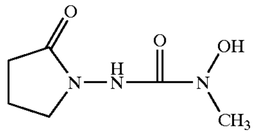
(I-69)
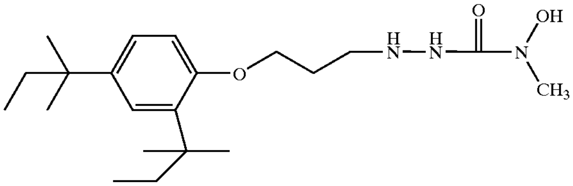
(I-70)
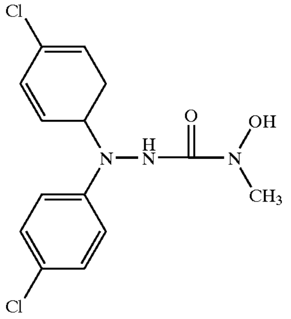
(I-71)
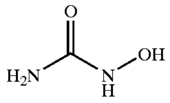
(I-72)
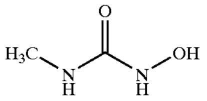
(I-73)
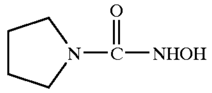
(I-74)
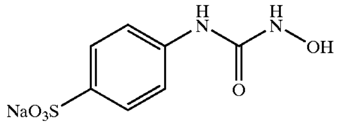
(I-75)
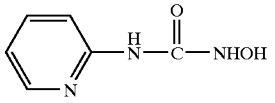
-continued
(I-76)
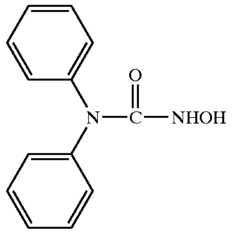
(I-77)
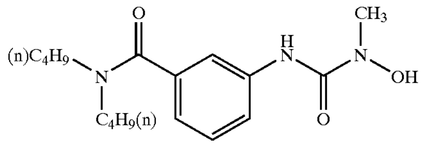
(I-78)
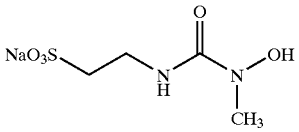
(I-79)
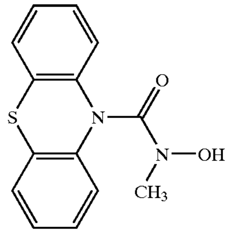
(I-80)
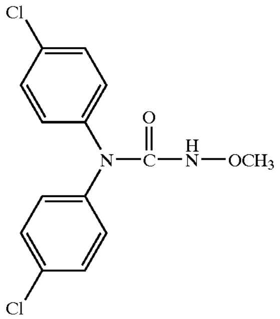
(I-81)
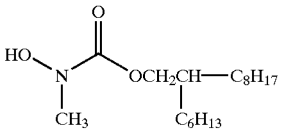
(I-82)
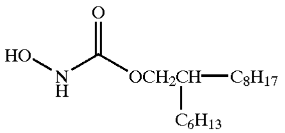
(I-83)
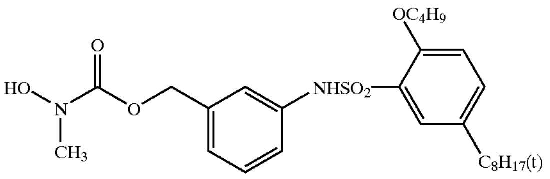

-continued (I-84)

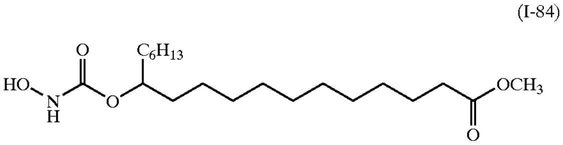

(I-85)

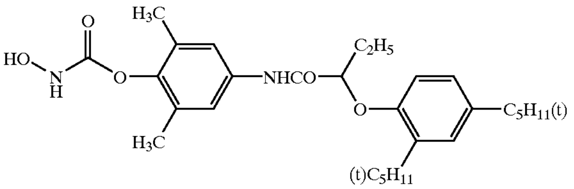

(I-86)

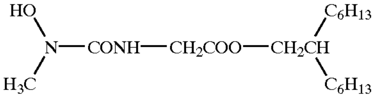

(I-87)

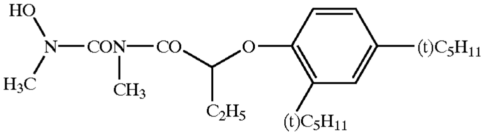

(I-88)

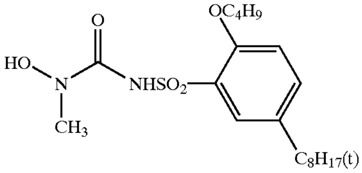

(I-89)

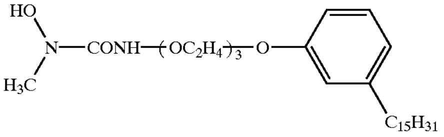

(I-90)

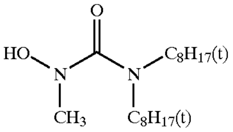

(I-91)

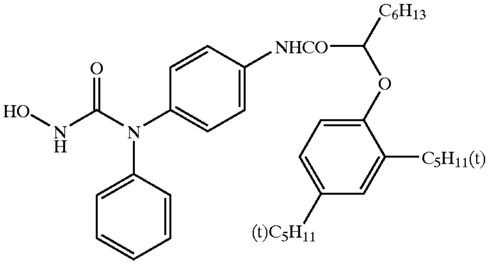

(I-92)

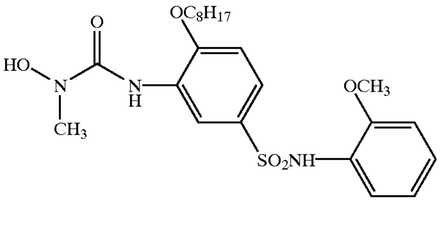

-continued (I-93)

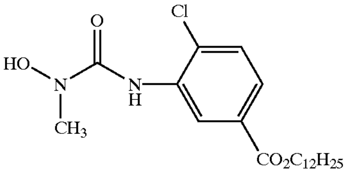

(I-94)

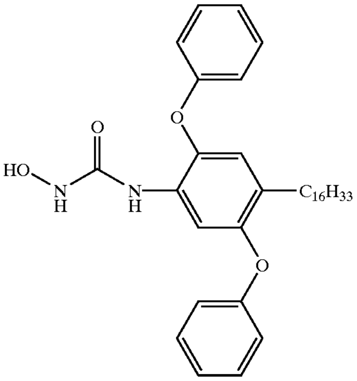

The inkjet recording ink composition preferably contains 2 to 200 parts by mass of the invention compound of the formula (I) based on 100 parts by mass of the dye. If necessary, two or more compounds are usable as a mixture of any mixing ratio. Compounds as described below may be used in combination. These compounds are usable in any phase of the inkjet recording ink composition, but coexistence with the azo dye is desired.

In the invention, various organic or metal complex type antifading agents can be used to improve the shelf life of images. Organic antifading agents include hydroquinones, alkoxyphenols, dialkoxyphenols, phenols, anilines, amines, indanes, coumarones, alkoxyanilines and heterocycles, while metal complex type antifading agents include nickel complexes and zinc complexes. More specifically, usable are compounds as cited in the patents described in Research Disclosure, No. 17643 (Sections I to J of VII), No. 15162, No. 18716 (left column on page 650), No. 36544 (page 527), No. 307105 (page 872), and No. 15162; and those embraced in the formula of the typical compounds and compound examples described on pages 127 to 137 of Japanese Patent Laid-Open No. 215272/1087.

As well as these compounds, alkene compounds of the formula (I) in U.S. Pat. No. 4,713,317, boron compounds of the formula (I) in Japanese Patent Laid-Open No. 174430/1992, epoxy compounds of the formula (II) in U.S. Pat. No. 5,183,731 and the formula (S1) in Japanese Patent Laid-Open No. 53431/1996, disulfide compounds of the formula in EP 271322B1 and the formulas (I), (II), (III) and (IV) in Japanese Patent Laid-Open No. 19736/1992, sulfinic acid compounds of the formula (I) in U.S. Pat. No. 4,770,987, reactive compounds of the formulas (I), (II), (III) and (IV) in U.S. Pat. No. 5,242,785, and cyclic phosphorous compounds of the formula (I) in Japanese Patent Laid-Open No. 283279/1996.

In the invention, metal complexes may be used. A number of metal complexes such as dithiolate nickel complexes and salicylaldoxime nickel complexes are known. Metal complexes such as those represented by the formula (I) in Japanese Patent Publication No. 13736/1986, the formula (I) in Japanese Patent Publication No. 13737/1986, the formula (I) in Japanese Patent Publication No. 13738/1986, the formula (I) in Japanese Patent Publication No. 13739/1986, the formula (I) in Japanese Patent Publication No. 13740/1986, the formula (I) in Japanese Patent Publication No. 13742/1986, the formula (I) in Japanese Patent Publication No. 13743/1986, the formula (I) in Japanese Patent Publication No. 13744/1986, the formula in Japanese Patent Publication No. 69212/1993, the formulas (I) and (II) in Japanese Patent Publication No. 88809/1993, the formula in Japanese Patent Laid-Open No. 199248/1988, the formulas (I) and (II) in Japanese Patent Publication No. 75568/1989, the formulas (I) and (II) in Japanese Patent Laid-Open No. 182749/1991, the formulas (II), (III), (IV) and (V) in U.S. Pat. No. 4,590,153, and the formulas (II), (III) and (IV) in U.S. Pat. No. 4,912,027.

Metal complexes represented by the formula (IIIA) are usable in the invention in consideration of their effects.

(IIIA)

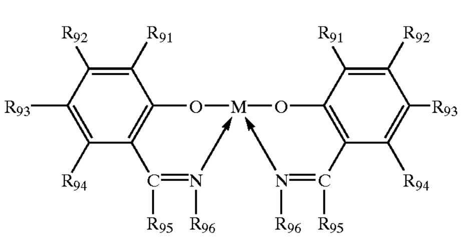

In the formula (IIIA), $R_{91}$, $R_{92}$, $R_{93}$ and $R_{94}$ each represents a substituent, $R_{95}$ represents a hydrogen atom, an aliphatic group or an aromatic group, $R_{96}$ represents a hydrogen atom, an aliphatic group, an aromatic group or a hydroxy group, and M stands for Cu, Co, Ni, Pd or Pt, or two $R_{96}$s may be coupled together to form a 5- to 7-membered ring, or any adjacent pair of $R_{91}$ and $R_{92}$, $R_{92}$ and $R_{93}$, $R_{93}$ and $R_{94}$, $R_{94}$ and $R_{95}$ may be coupled together to form a 5- or 6-membered ring.

Examples of the substituent $R_{91}$, $R_{92}$, $R_{93}$ or $R_{94}$ include aliphatic groups, aliphatic oxy groups, aliphatic sulfonyl groups, aromatic sulfonyl groups and acylamino groups. Examples of the aliphatic group as $R_{95}$ or $R_{96}$ include methyl, ethyl and undecyl groups and those of the aromatic group include phenyl group. As M, Ni is preferred.

The compounds of the formula (I) may be used in combination with an antistaining agent as described in Japanese Patent Laid-Open No. 104448/1995 (column 39/line 50 to column 70/line 9), Japanese Patent Laid-Open No. 77775/1995 (column 61/line 50 to column 62/line 49), or Japanese Patent Laid-Open No. 301895/1995 (column 87/line 49 to column 88/line 48); a ultraviolet absorber as described in Japanese Patent Laid-Open No. 215272/1987 (page 125/upper right column/line 2 to page 127/lower left column/last line), Japanese Patent Laid-Open No. 33144/1990 (page 37/lower right column/line 14 to page 38/upper left column/line 11), or European Patent No. 0.355.600A2 (page 85/line 22 to line 31); or an antifading agent as described in Japanese Patent Laid-Open No. 104448/1995 (column 70/line 10 to column 71/line 2).

The inkjet recording ink of the invention can be prepared by dissolving and/or dispersing, in an aqueous medium, the azo dye and a compound represented by the formula (I). The aqueous medium usable in the invention is obtained adding an additive such as humectant, stabilizer or antiseptic as needed to water or a mixture of water and a small amount of a water miscible organic solvent.

Examples of the water miscible organic solvent usable in the invention include alcohols (such as methanol, ethanol, propanol, isopropanol, butanol, isobutanol, sec-butanol, t-butanol, pentanol, hexanol, cyclohexanol and benzyl alcohol), polyhydric alcohols (such as ethylene glycol, diethylene glycol, triethylene glycol, polyethylene glycol, propylene glycol, dipropylene glycol, polypropylene glycol, butylene glycol, hexanediol, pentanediol, glycerin, hexane triol and thiodiglycol), glycol derivatives (such as ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethylether acetate, triethylene glycol monomethyl ether, triethylene glycol monoethyl ether and ethylene glycol monophenyl ether), amines (such as ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine and tetramethylpropylenediamine) and the other polar solvents (ex. formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile and acetone). At least two of these water miscible organic solvents can be used in combination.

When the azo dye is an oil soluble dye, it can be prepared by dissolving the oil soluble dye in a high-boiling-point organic solvent and then dispersing and emulsifying the resulting solution in an aqueous medium. When the compound of the formula (I) is used, it may be dispersed and emulsified together with the oil soluble dye and allowed to coexist with the dye in the same oil droplet. Alternatively, the dispersed emulsion obtained separately may be added or the compound may be dissolved or dispersed in an aqueous phase. Coexistence of it with the oil soluble dye in the same oil droplet is however preferred.

The high-boiling-point organic solvent to be used in the invention has a boiling point of 150° C. or greater, preferably 170° C. or greater.

Examples include phthalic acid esters (such as dibutyl phthalate, dioctyl phthalate, dicyclohexyl phthalate, di-2-ethylhexyl phthalate, decyl phthalate, bis(2,4-di-tert-amylphenyl) isophthalate, and bis(1,1-diethylpropyl) phthalate), phosphoric acid or phosphonic acid esters (such as diphenyl phosphate, triphenyl phosphate, tricresyl phosphate, 2-ethylhexyldiphenyl phosphate, dioctylbutyl phosphate, tricyclohexyl phosphate, tri-2-ethylhexyl phosphate, tridodecyl phosphate, and di-2-ethylhexylphenyl phosphate), benzoic acid esters (such as 2-ethylhexyl benzoate, 2,4-dichlorobenzoate, dodecyl benzoate, and 2-ethylhexyl-p-hydroxy benzoate), amides (such as N,N-diethyldodecanamide and N,N-diethyllaurylamide), alcohols or phenols (such as isostearyl alcohol and 2,4-di-tert-amylphenol), aliphatic esters (such as dibutoxyethyl succinate, di-2-ethylhexyl succinate, 2-hexyldecyl tetradecanoate, tributyl citrate, diethyl azelate, isostearyl lactate and trioctyl citrate), aniline derivatives (such as N,N-dibutyl-2-butoxy-5-tert-octylaniline), chlorinated paraffins (such as paraffins having a chlorine content of 10 to 80%), trimesic acid esters (such as tributyl trimesate), dodecyl benzene, diisopropyl naphthalene, phenols (such as 2,4-di-tert-amylphenol, 4-dodecyloxyphenol, 4-dodecyloxycarbonylphenol and 4-(4-dodecyloxyphenylsulfonylphenol), carboxylic acids (such as 2-(2,4-di-tert-amylphenoxybutyric acid and 2-ethoxyoctanedacanoic acid), and alkylphosphoric acids (such as di-2(ethylhexyl)phosphoric acid and diphenylphosphoric acid). These high-boiling-point organic solvents may be used in an amount of 0.01 to 20 times the mass, preferably 0.05 to 5 times the mass of the oil soluble dye.

These high-boiling-point organic solvents may be used either singly or at least two of them may be used in combination [for example, tricresyl phosphate and dibutyl phthalate, trioctyl phosphate and di(2-ethylhexyl)sebacate, or dibutyl phthalate and poly(N-t-butyl acrylamide)].

The other compounds serving as a high-boiling-point organic solvent and/or synthesizing processes thereof, each usable in the invention, are described in, for example, U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,430,422, 4,464,464, 4,483,918, 4,540,657, 4,684,606, 4,728,599, 4,745,049, 4,935,321, or 5,013,639; European Patent No. 2,76,319A, 286,253A, 289,820A, 309, 158A, 309,159A, 309,160A, 509,311A, or 510,576A; East German Patent No. 147,009, 157,147, 159,573, or 225, 240A; British Patent No. 2,091,124A; Japanese Patent Laid-Open Nos. 47335/1973, 26530/1975, 25133/1976, 26036/1976, 27921/1976, 27922/1976, 149028/1976, 46816/1977, 1520/1978, 1521/1978, 15127/1978, 146622/1978, 91325/1979, 106228/1979, 118246/1979, 59464/1980, 64333/1981, 81836/1981, 204041/1984, 84641/1986, 118345/1987, 247364/1987, 167357/1988, 214744/1988, 301941/1988, 9452/1989, 9454/1989, 68745/1989, 101543/1989, 102454/1989, 792/1990, 4239/1990, 43541/1990, 49237/1992, 30165/1992, 232946/1992 or 346338/1992.

The above-described high-boiling-point organic solvents may be used in an amount of 0.01 to 3.0 times the mass, preferably 0.01 to 1.0 time the mass of the oil soluble dye.

In the invention, the oil soluble dye or high-boiling-point organic solvent is dispersed and emulsified in an aqueous medium. Upon emulsification and dispersion, a low-boiling-point organic solvent are usable from the viewpoint of emulsifying properties. The low-boiling-point organic solvent is an organic solvent having a boiling point of 30° C. or greater but not greater than 150° C. under normal pressure. Preferred examples include, but not limited to, esters (ethyl acetate, butyl acetate, ethyl propionate, β-ethoxyethyl acetate and methyl cellosolve acetate), alcohols (such as isopropyl alcohol, n-butyl alcohol and secondary butyl alcohol), ketones (such as methyl isobutyl ketone, methyl ethyl ketone and cyclohexanone), amides (such as dimethylformamide and N-methylpyrrolidone) and ethers (such as tetrahydrofuran and dioxane).

Emulsification and dispersion are conducted for the purpose of forming fine oil droplets of an oil phase by dispersing, in an aqueous phase composed mainly of water, an oil phase having a dye dissolved in a high-boiling-point organic solvent, in some cases, in a mixed solvent thereof with a low-boiling-point organic solvent. At this time, to either one of the aqueous phase or oil phase or both of them, an additive such as surfactant, humectant, dye stabilizer, emulsion stabilizer, antiseptic and/or antifungal agent, which will be described later, may be added as needed.

Emulsification is usually conducted by adding an oil phase to an aqueous phase. Alternatively, so-called phase inversion emulsification wherein an aqueous phase is added dropwise to an oil phase can be preferably employed.

Various surfactants can be employed upon dispersion and emulsification in the invention. Preferred examples include anionic surfactants such as fatty acid salts, alkyl sulfates, alkylbenzene sulfonates, alkylnaphthalene sulfonates, dialkyl sulfosuccinates, alkyl phosphates, naphthalenesulfonic acid-formalin condensate, and polyoxyethylene alkyl sulfates; and nonionic surfactants such as polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkyl amines, glycerin fatty acid esters, and oxyethylene oxypropylene block copolymers. As well as these surfactants, SURFYNOLS (trade name; product of Air Products & Chemicals) which are acetylene series polyoxyethylene oxide surfactants are preferred. Amine oxide type amphoteric surfactants such as N,N-dimethyl-N-alkylamine oxides are also preferred. Moreover, surfactants as described in Japanese Patent Laid-Open No. 157,636/1984 (pp. 37–38), and Research Disclosure No. 308119 (1989) are also usable.

In order to stabilize the emulsion rightly after emulsification, a water soluble polymer can be added in combination with the surfactant. As the water soluble polymer, polyvinyl alcohol, polyvinyl pyrrolidone, polyethylene oxide, polyacrylic acid and polyacrylamide, and copolymers thereof are preferred. Natural water-soluble polymers such as polysaccharides, casein and gelatin are also preferred. In order to stabilize the dispersion of a dye, it is possible to use, in combination, polyvinyl, polyurethane, polyamide, polyurea or polycarbonate available by the polymerization of an acrylate ester, methacrylate ester, vinyl ester, acrylamide, methacrylamide, olefin, styrene, vinyl ether, or acrylonitrile, which polymer is substantially insoluble in an aqueous medium. These polymers preferably contain —$SO^{2-}$ or —$COO^-$. When such a polymer substantially insoluble in an aqueous medium is used in combination, it is used preferably in an amount not greater than 20% by mass, more preferably not greater than 10% by mass, based on the high-boiling-point organic solvent.

Upon preparation of an aqueous ink by dispersing and emulsifying an oil soluble dye or high-boiling-point organic solvent, control of its particle size is of particular importance. It is essential to minimize the average particle size in order to heighten color purity or density upon formation of an image by inkjet. The volume-average particle size is preferably 1 μm or less, more preferably 5 to 100 nm.

The volume average particle size and particle distribution of the dispersed particles can be measured readily in a known manner, for example, the static light scattering method, dynamic light scattering method, centrifugal precipitation method or the method described on pages 417 to 418 of Jikken Kagaku Koza, 4th Edition. For example, a particle size can be measured easily by diluting an ink with distilled water to give the particle concentration in the ink of 0.1 to 1% by mass and measuring the resulting diluted ink by a commercially available volume-average particle size measuring instrument (for example, Microtrac UPA (trade name; product of Nikkiso Co., Ltd.). The dynamic light scattering method using Laser Doppler effect permits measurement of small particle size so that it is especially preferred.

The volume-average particle size is an average particle size based on the volume of the particles and it is found by multiplying the diameter of each particle by its volume and then dividing the sum of the products by the total volume of the particles. There is a description on page 119 of "Chemistry of High Molecular Latex" (written by Soichi Muroi, published by Kobunshi Kankokai).

It has been revealed that the existence of coarse particles plays an important role in printing performance. Described specifically, coarse particles cause clogging of a head nozzle or, if not so, form a stain and prevent discharge or cause irregular discharge of the ink, thereby having a serious influence on the printing performance. To prevent such phenomena, it is important to control the number of the particles having a particle size of 5 μm or greater to 10 or less and the number of the particles having a particle size of 1 μm or greater to 100 or less, in 1 μl of the resulting ink.

Such coarse particles can be removed by known centrifugal separation or precise filtration. Such separation may be conducted rightly after dispersion and emulsification, or after addition of various additives such as humectant and surfactant to the emulsified dispersion but rightly before filling a cartridge with the mixture.

A mechanical emulsifier can be employed as effective means for decreasing the average particle size and removing coarse particles.

As the emulsifier, usable are known ones such as simple-system stirrer, mill-system emulsifiers such as impeller agitator, inline agitator and colloid mill and ultrasonic system emulsifier, with use of a high pressure homogenizer being especially preferred.

Specific mechanism of a high pressure homogenizer is described in U.S. Pat. No. 4,522,354 or Japanese Patent Laid-Open No. 47264/1994. Examples of the commercially available one include Gaulin homogenizer (product of A.P.V GAULIN INC), microfluidizer (product of MICROFLUIDEX INC.) and Ultimaizer (product of Sugino Machine).

A recently developed high pressure homogenizer as described in U.S. Pat. No. 5,720,551 having a mechanism for forming fine droplets in a ultrahigh pressure jet stream is particularly effective for dispersion and emulsification of the invention. "DeBEE 2000" (product of BEE INTERNATIONAL LTD.) is one of the emulsifiers adopting this ultrahigh pressure jet stream.

The pressure upon emulsification by a high pressure emulsifier is at least 50 MPa, preferably at least 60 MPa, still more preferably at least 180 MPa.

Use of at least two emulsifiers, for example, successive use of a stirring emulsifier and a high pressure homogenizer is particularly preferred. It is also preferred to disperse and emulsify by such emulsifiers, add to the resulting emulsion an additive such as humectant or surfactant and subject the resulting mixture to high pressure homogenizer again while filling a cartridge with the resulting ink.

When both of a high boiling point organic solvent and a low boiling point organic solvent are incorporated, removal of the low boiling point solvent is preferred for stability, safety and sanitation of the emulsion. The low boiling point solvent can be removed in a known manner, for example, evaporation, vacuum evaporation or ultrafiltration, depending on the kind of the solvent. This removal of the low boiling point organic solvent is preferably conducted as soon as possible rightly after emulsification.

When the inkjet recording ink composition obtained by the invention is used for inkjet recording, additives selected as needed from antidrying agent for preventing clogging at a jet orifice due to drying of an ink, penetration promoter to promote penetration of an ink into paper, ultraviolet absorber, antioxidant, viscosity regulator, surface tension regulator, dispersant, dispersion stabilizer, antifungal agent, rust preventive, pH regulator, antifoaming agent and chelating agent can be added.

As the antidrying agent to be used in the invention, water soluble organic solvents having a vapor pressure lower than that of water are preferred. Specific examples include polyhydric alcohols typified by ethylene glycol, propylene glycol, diethylene glycol, polyethylene glycol, thiodiglycol, dithiodiglycol, 2-methyl-1,3-propanediol, 1,2,6-hexanetriol, acetylene glycol derivative, glycerin and trimethylolpropane; lower alkyl ethers of a polyvalent alcohol such as ethylene glycol monomethyl (or ethyl) ether, diethylene glycol monomethyl (or ethyl) ether and triethylene glycol monoethyl (or butyl) ether; heterocyclics such as 2-pyrrolidone, N-methyl-2-pyrrolidone, 1,3-dimethyl-2-imidazolidinone and N-ethylmorpholine; sulfur-containing compounds such as sulfolane, dimethylsulfoxide and 3-sulfolene; polyfunctional compounds such as diacetone alcohol and diethanolamine; and urea derivatives. Of these, polyhydric alcohols such as glycerin and diethylene glycol are more preferred. The above-exemplified antidrying agents may be used either singly or in combination. The antidrying agent is preferably added in an amount of 10 to 50% by mass of the ink.

Examples of the penetration promoter usable in the invention include alcohols such as ethanol, isopropanol, butanol, di- or tri-ethylene glycol monobutyl ether, and 1,2-hexanediol and nonionic surfactants such as sodium lauryl sulfate and sodium oleate. Incorporation of it in an amount of 10 to 30% by mass in an ink brings about sufficient effects. It is preferably added in an amount within a range causing neither bleeding of print nor print-through.

Examples of the ultraviolet absorber to be used in the invention for improving the shelf life of images include benzotriazole compounds as described in Japanese Patent Laid-Open No. 185677/1983, 190537/1986, 782/1990, 197075/1993 and 34057/1997, benzophenone compounds as described in Japanese Patent Laid-Open No. 2784/1971 and 194483/1993 and U.S. Pat. No. 3,214,463, cinnamic acid compounds as described in Japanese Patent Publication No. 30492/1983 and 21141/1981 and Japanese Patent Laid-Open No. 88106/1998, triazine compounds as described in Japanese Patent Laid-Open No. 298503/1992, 53427/1996, 239368/1996 and 182621/1998 and International Patent Publication No. 501291/1996, and compounds so called fluorescent brightener such as those as described in Research Disclosure No. 24239, stilbene and benzoxazole compounds which emit fluorescence, absorbing ultraviolet rays.

Examples of the antifungal agent usable in the invention include sodium dehydroacetate, sodium benzoate, sodium pyridinethion-1-oxide, ethyl p-hydroxybenzoate and 1,2-benzisothiazolin-3-one and salts thereof. It is preferably added in an amount of 0.02 to 5.00% by mass of the ink.

Details of the antifungal agent are described in "Dictionary of Antibacterial and Antifungal Agents" (ed. by The Society for Antibacterial and Antifungal Agents, Japan).

Examples of the rust inhibitor include acidic sulfite, sodium thiosulfate, ammonium thioglycolate, diisopropylammonium nitrite, pentaerythritol tetranitrate, dicyclohexylammonium nitrite and benzotriazole. It is preferably added in an amount of 0.02 to 5.00% by mass in the ink.

The pH regulator to be used in the invention functions well for regulating pH of the ink and imparting it with dispersion stability. It is preferably added to adjust its pH to 4.5 to 10.0, more preferably to 6 to 10.0.

As basic pH regulators, organic bases and inorganic alkalis are usable while as acidic ones, organic acids and inorganic acids are usable.

The organic bases include triethanolamine, diethanolamine, N-methyldiethanolamine and dimethylethanolamine. The inorganic alkalis include hydroxides of an alkali metal (ex. sodium hydroxide, lithium hydroxide and potassium hydroxide), carbonates (ex. sodium carbonate and sodium bicarbonate) and ammonia.

The organic acids include acetic acid, propionic acid, trifluoroacetic acid and alkylsulfonic acid. The inorganic acids include hydrochloric acid, sulfuric acid and phosphoric acid.

As the surface tension regulator, noionic, cationic and anionic surfactants are usable in the invention. Examples of the anionic surfactants include fatty acid salts, alkyl sulfates, alkyl benzenesulfonates, alkyl naphthalene sulfonates, dialkyl sulfosuccinates, alkylphosphates, naphthalenesulfonate formalin condensate, and polyoxyethylene alkyl sulfate esters; those of the nonionic surfactants include polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkylamines, glycerin fatty acid esters, and oxyethylene oxypropylene block copolymers. SURFYNOLS (trade name; product of Air Products & Chemicals Inc.) which are acetylene type polyoxyethylene oxide surfactants are also preferably employed. Amine oxide type amphoteric surfactants such as N,N-dimethyl-N-alkylamine oxide are also preferred. Surfactants as described in Japanese Patent Laid-Open No. 157,636/1984 (pp. 37–38) and Research Disclosure No. 308119 (1989) are also usable.

The ink of the invention containing or not containing such a regulator is preferred to have a surface tension of 20 to 60 mN/m, more preferably 25 to 45 mN/m.

The ink usable in the invention has preferably a viscosity of 30 mPa·s or less. It is preferably adjusted to 20 mPa·s or less. A viscosity regulator is sometimes added to adjust its viscosity. Examples of the viscosity regulators include celluloses, water soluble polymers such as polyvinyl alcohol, and nonionic surfactants. More specific description about viscosity regulators can be found in Chapter 9 of "Viscosity Regulating Technique" (Information Technology Association, 1999) and pages 162 to 174 of "Chemicals for Inkjet Printers (Supplement, 98)—Researches on Development Trend and Prospect of Materials—" (CMC, 1997)).

In the invention, it is also possible to add, as needed, the above-described cationic, anionic or nonionic surfactant as a dispersant or dispersion stabilizer, and a fluorine or silicon compound, or a chelating agent typified by EDTA as an antifoaming agent.

Recording paper and recording film to be used in the image recording method of the invention will next be described. As recording paper and recording film, usable are those having, as a support, chemical pulp such as LBKP or NBKP, mechanical pulp such as GP, PGW, RMP, TMP, CTMP, CMP or CGP, or recycled pulp such as DIP, to which conventionally known additives such as pigment, binder, sizing agent, fixer, cationic agent and paper strength agent have been added as needed, and made using paper machine such as wire paper machine or cylinder paper machine. Alternatively, the support may be synthetic paper or plastic film sheet and it preferably has a thickness of 10 to 250 μm and a basis weight of 10 to 250 g/m$^2$.

The support may be used as a receiving material after disposing thereon an image receiving layer and back coat layer, or after disposing a size press or anchor coat layer by using starch or polyvinyl alcohol and then disposing thereon an image receiving layer and a back coat layer. The support may further be subjected to flattening treatment by a calendering machine such as machine calender, TG calender or soft calender.

In the invention, paper or a plastic film having both sides thereof laminated with polyolefin (ex. polyethylene, polystyrene, polyethylene terephthalate or polybutene, or copolymer thereof) is preferably employed as the support. Addition of a white pigment (ex. titanium oxide or zinc oxide) or a tinting dye (ex. cobalt blue, ultramarine or neodium oxide) to polyolefin is preferred.

In the image receiving layer disposed on the support, a porous material and an aqueous binder are incorporated. The image receiving layer preferably contains a pigment, preferably a white pigment. Examples of the white pigment include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate and organic pigments such as styrene pigments, acrylic pigments, urea resins and melamine resins. As the white pigment, porous white inorganic pigment, particularly, synthetic amorphous silica having a large pore area is preferred. As the synthetic amorphous silica, silicic anhydride available by dry process and hydrated silicic acid available by wet process are usable, of which hydrated silicic acid is desired. These pigments may be used in combination.

Examples of the aqueous binder contained in the image receiving layer include water-soluble polymers such as polyvinyl alcohol, silanol-modified polyvinyl alcohol, starch, cationated starch, casein, gelatin, carboxymethyl cellulose, hydroxyethyl cellulose, polyvinylpyrrolidone, polyalkylene oxide and polyalkylene oxide derivatives and water-dispersible polymers such as styrene butadiene latex and acrylic emulsion. These aqueous binders may be used either singly or in combination. Of them, polyvinyl alcohol and silanol-modified polyvinyl alcohol are particularly preferred from the viewpoints of adhesion to the pigment and peel resistance of the ink receptive layer.

The image receiving layer may contain, in addition to, the pigment and aqueous binder, a mordant, a water proofing agent, light resistance improver, surfactant, hardener and the like additives.

The mordant to be added to the image receiving layer is preferably immobilized. A polymeric mordant is preferably employed for this purpose.

Polymeric mordants are described in Japanese Patent Laid-Open Nos. 28325/1973, 74430/1979, 124726/1979, 22766/1980, 142339/1980, 23850/1985, 23851/1985, 23852/1985, 23853/1985, 57836/1985, 60643/1985, 118834/1985, 122940/1985, 122941/1985, 122942/1985, 235134/1985 and 161236/1989, and U.S. Pat. Nos. 2,484,430, 2,548,564, 3,148,061, 3,309,690, 4,115,124, 4,124,386, 4,193,800, 4,273,853, 4,282,305 and 4,450,224. Image receiving materials containing the polymer mordant as described on pages 212 to 215 of Japanese Patent Laid-Open 161236/1989 are particularly preferred. Use of these polymer mordants makes it possible to form an image having excellent image quality and improved light resistance.

A water proofing agent is effective for improving water resistance of an image and as this agent, cationic resins are particularly desired. These cationic resins include polyamide polyamine epichlorohydrin, polyethyleneimine, polyaminesulfone, dimethyldiallyl ammonium chloride polymer, cation polyacrylamide and colloidal silica. Of these cationic resins, polyamide polyamine epichlorohydrin is particularly preferred. The cationic resin is preferably added in an amount of 1 to 15% by mass, particularly 3 to 10% by mass based on the whole solid content of the ink receiving layer.

Examples of the light resistance improver include zinc sulfate, zinc oxide, hindered amine antioxidants and benzotriazole ultraviolet absorbers such as benzophenone, of which zinc sulfate is particularly preferred.

The surfactant functions as a coating aid, peeling improver, slip improver or antistatic agent. Description on it can be found in Japanese Patent Laid-Open No. 173463/1987 and 183457/1987.

Instead of the surfactant, organofluoro compounds may be employed. They are preferably hydrophobic. Examples include fluorine surfactants, oily fluorine compounds (ex. fluorine oil) and solid fluorine compound resins (ex. ethylene tetrafluoride resins). Organofluoro compounds are described in Japanese Patent Publication No. 9053/1982 (8th to 17th columns), and Japanese Patent Laid-Open No. 20994/1986 and 135826/1987.

As the hardener, materials as described on page 222 of Japanese Patent Laid-Open No. 161236/1989 are usable.

As the other additives to the image receiving layer, pigment dispersants, thickeners, antifoaming agents, dyes, fluorescent brighteners, antiseptics, pH regulators, matting agents and hardeners can be used. The ink receiving layer may be a single layer or a double layer.

The recording paper or recording film may have a back coat layer disposed thereon. To this layer, white pigments, aqueous binders and the other components can be added.

Examples of the white pigment to be incorporated in the back coat layer include white inorganic pigments such as light calcium carbonate, heavy calcium carbonate, kaolin, talc, calcium sulfate, barium sulfate, titanium dioxide, zinc oxide, zinc sulfide, zinc carbonate, titan white (white satin), aluminum silicate, diatomaceous earth, calcium silicate, magnesium silicate, synthetic amorphous silica, colloidal silica, colloidal alumina, pseudo boehmite, aluminum hydroxide, alumina, litopone, zeolite, hydrated halloysite, magnesium carbonate and magnesium hydroxide, and organic pigments such as styrene plastic pigment, acrylic plastic pigment, polyethylene, microcapsules, urea resins and melamine resins.

As the aqueous binder to be incorporated in the back coat layer, usable are water soluble polymers such as styrene/maleate salt copolymers, styrene/acrylate salt copolymers, polyvinyl alcohol, silanol-modified polyvinyl alcohol, starch, cationated starch, casein, gelatin, carboxymethyl cellulose, hydroxyethyl cellulose and polyvinylpyrrolidone, and water dispersible polymers such as styrene butadiene latex and acrylic emulsion. Examples of the other component to be incorporated in the back coat layer include antifoaming agent, foaming inhibitor, dye, fluorescent brightener, antiseptic and water proofing agent.

To layers (including back layer) constituting the ink-jet recording paper or recording film, a fine particle dispersion of a polymer may be added. It is used in order to improve the physical properties of a film, for example, stabilizing size and preventing curling, adhesion and cracks. A description on the fine particle dispersion of a polymer can be found in Japanese Patent Laid-Open No. 245258/1987, 1316648/1987 and 110066/1987. Addition of a fine particle dispersion of a polymer having a low glass transition point (40° C. or lower) to a mordant-containing layer enables to prevent occurrence of cracks or curing of the layer. Addition of a fine particle dispersion of a polymer having a high glass transition point also prevents occurrence of curling when added to the back layer.

The ink composition of the invention can be used, without being limited by its recording method, in a known recording process, for example, a charge control process of ejecting ink by making use of electrostatic induction power, drop-on-demand process (pressure pulse process) making use of oscillation pressure of a piezoelectric element, acoustic ink-jet process of exposing ink to acoustic beams converted from electric signals and utilizing a radiation pressure for discharging ink, and thermal ink-jet (bubble jet) process of heating ink to form bubbles and making use of the pressure thus generated.

Ink-jet recording methods include a method of jetting a number of photoinks, that is, small-volume inks having a low density, a method of improving image quality by using a plurality of inks having substantially the same hue but different concentrations and a method of using a colorless transparent ink.

EXAMPLES

The present invention will hereinafter be described in detail by Examples. It should however be borne in mind that the present invention is not limited to or by them.

Example 1

(Preparation of Ink Set 101)

To the below-described components, deionized water was added to give the whole amount of 1 liter. While heating at 30 to 40° C., the mixture was stirred for one hour. The reaction mixture was then adjusted to pH 9 with 10 mol/l of KOH, followed by filtration, under reduced pressure, through a microfilter having a average pore size of 0.25 $\mu$m, whereby a light magenta ink solution was prepared.

| | |
|---|---|
| Magenta dye of the invention (1–27) | 7.5 g/l |
| Diethylene glycol | 150 g/l |
| Urea | 37 g/l |
| Glycerin | 130 g/l |
| Triethylene glycol monobutyl ether | 130 g/l |
| Invention Compound (I-4) (100 mol % relative to the dye) | 2.0 g/l |
| Surfynol 465 | 12.5 g/l |
| Triethanolamine | 6.9 g/l |
| Benzotriazole | 0.08 g/l |
| PROXEL XL2 | 3.5 g/l |

In a similar manner to the above-described method except that the kind of a dye or additive was changed, magenta ink, light cyan ink, cyan ink, yellow ink and black ink were prepared to form Ink Set 101 as shown in Table 14.

TABLE 14

| | Light magenta | Magenta | Light cyan | Cyan | Yellow | Black |
|---|---|---|---|---|---|---|
| Dye (g/l) | (a-27)<br>7.5<br>1 | (a-27)<br>30.0 | A-2<br>8.75 | A-2<br>35.0 | A-3<br>14.7<br>A-4<br>14.0 | A-5<br>20.0<br>A-6<br>20.0<br>A-7<br>20.0<br>A-3<br>21.0 |

TABLE 14-continued
| | | | | | | |
|---|---|---|---|---|---|---|
| Diethylene glycol (g/l) | 50 | 112 | 130 | 200 | 160 | 20 |
| Urea (g/l) | 37 | 46 | — | — | — | — |
| Glycerin (g/l) | 130 | 130 | 150 | 180 | 150 | 120 |
| Triethylene glycol monobutyl ether (g/l) | 130 | 140 | 130 | 140 | 130 | — |
| Diethylene glycol monobutyl ether (g/l) | — | — | — | — | — | 230 |
| 2-Pyrrolidone (g/l) | — | — | — | — | — | 81 |
| Compound of formula (I) (g/l) | (1-4) 2.0 | (1-4) 8.0 | — | — | — | — |
| Surfynol 465 (g/l) | 12.5 | 11.5 | 11.1 | 9.8 | — | — |
| Surfynol STG (g/l) | — | — | — | — | 9.0 | 8.5 |
| Triethanolamine (g/l) | 6.9 | 7.0 | 6.0 | 6.7 | 0.8 | 18.9 |
| Benzotriazole (g/l) | 0.08 | 0.07 | 0.08 | 0.08 | 0.06 | 0.06 |
| Proxel XL2 (g/l) | 3.5 | 2.5 | 1.8 | 2.0 | 2.5 | 1.8 |
Deionized water is added to give the total amount of 1 liter.
A-1
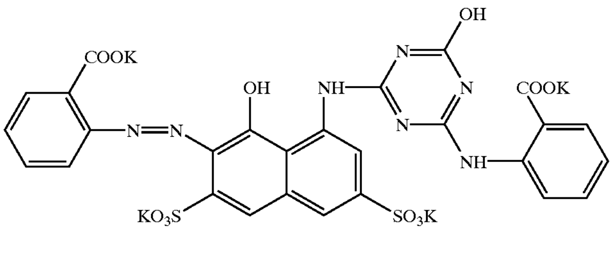
A-2
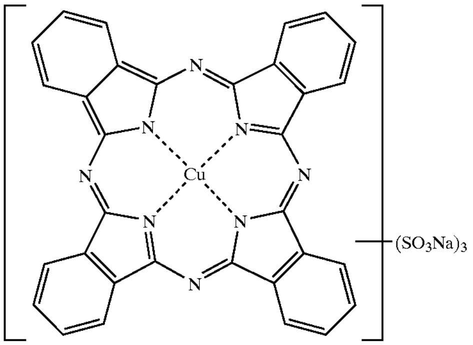
A-3
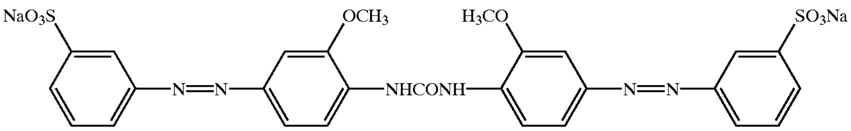
A-4
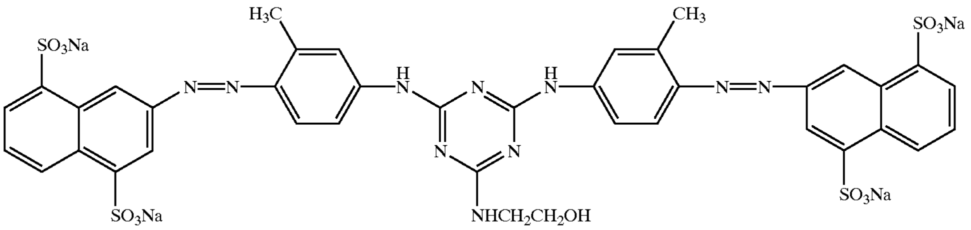

TABLE 14-continued

A-5

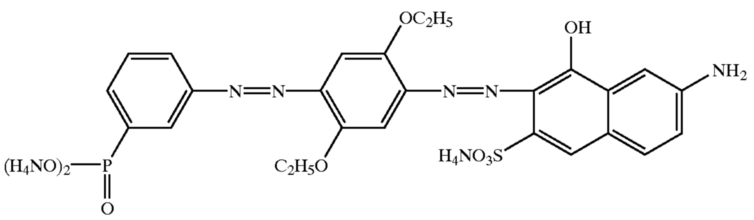

A-6

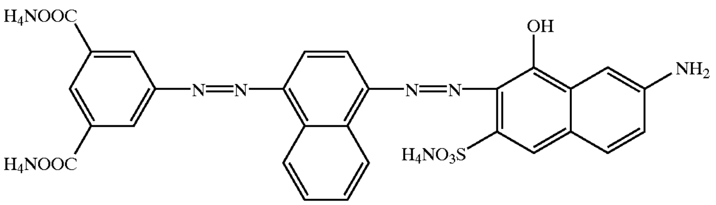

A-7

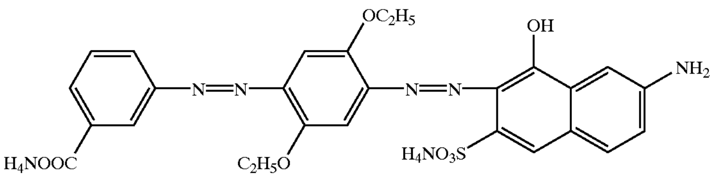

Ink sets 102 to 167 were then prepared in a similar manner to that employed for Ink set 101 except that the kind or amount of the dye or the invention compound was changed as described in Tables 15 to 17. When the dye was changed, it was added in an equimolar amount to Ink set 101. When at least two of the dyes were used in combination, they were used each in an equimolar amount and the total amount of them was adjusted to be equimolar to Ink set 101. When the invention compound was used, the compound of the formula (I) was used at a molar ratio as shown in Tables 15 to 17 relative to the dye. When at least two of the invention compounds were used, the molar ratio was adjusted also in accordance with Tables 15 to 17. In addition, Ink sets 121, 128, 135, 142, 149, 156, 166, 167 were prepared as comparative products.

TABLE 15

| Ink set | | Light magenta | Magenta | Remarks |
|---|---|---|---|---|
| 102 | Dye | a-27 | a-27 | Invention |
| | Compound of formula (I) (molar ratio relative to dye) | I-13 (100 mol %) | I-13 (100) | product |
| 103 | Dye | a-27 | a-27 | Invention |
| | Compound of formula (I) (molar ratio relative to dye) | I-24 (100 mol %) | I-24 (100) | product |
| 104 | Dye | a-27 | a-27 | Invention |
| | Compound of formula (I) (molar ratio relative to dye) | I-34 (100 mol %) | I-34 (100) | product |
| 105 | Dye | a-27 | a-27 | Invention |
| | Compound of formula (I) (molar ratio relative to dye) | I-35 (100 mol %) | I-35 (100) | product |
| 106 | Dye | a-27 | a-27 | Invention |
| | Compound of formula (I) (molar ratio relative to dye) | I-41 (100 mol %) | I-41 (100) | product |
| 107 | Dye | a-27 | a-27 | Invention |
| | Compound of formula (I) (molar ratio relative to dye) | I-43 (100 mol %) | I-43 (100) | product |
| 108 | Dye | a-27 | a-27 | Invention |
| | Compound of formula (I) (molar ratio relative to dye) | I-51 (100 mol %) | I-51 (100) | product |
| 109 | Dye | a-27 | a-27 | Invention |
| | Compound of formula (I) (molar ratio relative to dye) | I-52 (100 mol %) | I-52 (100) | product |
| 110 | Dye | a-27 | a-27 | Invention |
| | Compound of formula (I) (molar ratio relative to dye) | I-57 (100 mol %) | I-57 (100) | product |
| 111 | Dye | a-27 | a-27 | Invention |
| | Compound of formula (I) (molar ratio relative to dye) | I-58 (100 mol %) | I-58 (100) | product |
| 112 | Dye | a-27 | a-27 | Invention |
| | Compound of formula (I) (molar ratio relative to dye) | I-59 (100 mol %) | I-59 (100) | product |

TABLE 15-continued

| Ink set | | Light magenta | Magenta | Remarks |
|---|---|---|---|---|
| 113 | Dye | a-27 | a-27 | Invention |
| | Compound of formula (I) (molar ratio relative to dye) | I-61 (100 mol %) | I-61 (100) | product |
| 114 | Dye | a-27 | a-27 | Invention |
| | Compound of formula (I) (molar ratio relative to dye) | I-63 (100 mol %) | I-63 (100) | product |
| 115 | Dye | a-27 | a-27 | Invention |
| | Compound of formula (I) (molar ratio relative to dye) | I-71 (100 mol %) | I-71 (100) | product |
| 116 | Dye | a-27 | a-27 | Invention |
| | Compound of formula (I) (molar ratio relative to dye) | I-73 (100 mol %) | I-73 (100) | product |
| 117 | Dye | a-27 | a-27 | Invention |
| | Compound of formula (I) (molar ratio relative to dye) | I-78 (100 mol %) | I-78 (100) | product |
| 118 | Dye | a-27 | a-27 | Invention |
| | Compound of formula (I) (molar ratio relative to dye) | I-65 (100 mol %) | I-65 (100) | product |
| 119 | Dye | a-27 | a-27 | Invention |
| | Compound of formula (I) (molar ratio relative to dye) | I-66 (100 mol %) | I-66 (100) | product |
| 120 | Dye | a-27 | a-27 | Invention |
| | Compound of formula (I) (molar ratio relative to dye) | I-67 (100 mol %) | I-67 (100) | product |
| 121 | Dye | a-27 | a-27 | Comparative |
| | Compound of formula (I) (molar ratio relative to dye) | — | — | example |
| 122 | Dye | a-26 | a-26 | Invention |
| | Compound of formula (I) (molar ratio relative to dye) | I-13 (100 mol %) | I-13 (100) | product |
| 123 | Dye | a-26 | a-26 | Invention |
| | Compound of formula (I) (molar ratio relative to dye) | I-35 (100 mol %) | I-35 (100) | product |
| 124 | Dye | a-26 | a-26 | Invention |
| | Compound of formula (I) (molar ratio relative to dye) | I-51 (100 mol %) | I-51 (100) | product |

TABLE 16

| Ink set | | Light magenta | Magenta | Remarks |
|---|---|---|---|---|
| 125 | Dye | a-26 | a-26 | Invention |
| | Compound of formula (I) (molar ratio relative to dye) | I-58 (100 mol %) | I-58 (100) | product |
| 126 | Dye | a-26 | a-26 | Invention |
| | Compound of formula (I) (molar ratio relative to dye) | I-78 (100 mol %) | I-78 (100) | product |
| 127 | Dye | a-26 | a-26 | Invention |
| | Compound of formula (I) (molar ratio relative to dye) | I-66 (100 mol %) | I-66 (100) | product |
| 128 | Dye | a-26 | a-26 | Comparative |
| | Compound of formula (I) (molar ratio relative to dye) | — | — | example |
| 129 | Dye | b-5 | b-5 | Invention |
| | Compound of formula (I) (molar ratio relative to dye) | I-13 (100 mol %) | I-13 (100) | product |
| 130 | Dye | b-5 | b-5 | Invention |
| | Compound of formula (I) (molar ratio relative to dye) | I-35 (100 mol %) | I-35 (100) | product |
| 131 | Dye | b-5 | b-5 | Invention |
| | Compound of formula (I) (molar ratio relative to dye) | I-51 (100 mol %) | I-51 (100) | product |
| 132 | Dye | b-5 | b-5 | Invention |
| | Compound of formula (I) (molar ratio relative to dye) | I-58 (100 mol %) | I-58 (100) | product |
| 133 | Dye | b-5 | b-5 | Invention |
| | Compound of formula (I) (molar ratio relative to dye) | I-78 (100 mol %) | I-78 (100) | product |
| 134 | Dye | b-5 | b-5 | Invention |
| | Compound of formula (I) (molar ratio relative to dye) | I-66 (100 mol %) | I-66 (100) | product |
| 135 | Dye | b-5 | b-5 | Comparative |
| | Compound of formula (I) (molar ratio relative to dye) | — | — | example |
| 136 | Dye | c-3 | c-3 | Invention |
| | Compound of formula (I) (molar ratio relative to dye) | I-13 (100 mol %) | I-13 (100) | product |
| 137 | Dye | c-3 | c-3 | Invention |
| | Compound of formula (I) (molar ratio relative to dye) | I-35 (100 mol %) | I-35 (100) | product |
| 138 | Dye | c-3 | c-3 | Invention |
| | Compound of formula (I) (molar ratio relative to dye) | I-51 (100 mol %) | I-51 (100) | product |
| 139 | Dye | c-3 | c-3 | Invention |
| | Compound of formula (I) (molar ratio relative to dye) | I-58 (100 mol %) | I-58 (100) | product |
| 140 | Dye | c-3 | c-3 | Invention |
| | Compound of formula (I) (molar ratio relative to dye) | I-78 (100 mol %) | I-78 (100) | product |
| 141 | Dye | c-3 | c-3 | Invention |
| | Compound of formula (I) (molar ratio relative to dye) | I-66 (100 mol %) | I-66 (100) | product |
| 142 | Dye | c-3 | c-3 | Comparative |
| | Compound of formula (I) (molar ratio relative to dye) | — | — | example |
| 143 | Dye | d-1 | d-1 | Invention |
| | Compound of formula (I) (molar ratio relative to dye) | I-13 (100 mol %) | I-13 (100) | product |
| 144 | Dye | d-1 | d-1 | Invention |
| | Compound of formula (I) (molar ratio relative to dye) | I-35 (100 mol %) | I-35 (100) | product |
| 145 | Dye | d-1 | d-1 | Invention |
| | Compound of formula (I) (molar ratio relative to dye) | I-51 (100 mol %) | I-51 (100) | product |
| 146 | Dye | d-1 | d-1 | Invention |
| | Compound of formula (I) (molar ratio relative to dye) | I-58 (100 mol %) | I-58 (100) | product |

TABLE 16-continued

| Ink set | | Light magenta | Magenta | Remarks |
|---|---|---|---|---|
| 147 | Dye | d-1 | d-1 | Invention |
| | Compound of formula (I) (molar ratio relative to dye) | I-78 (100 mol %) | I-78 (100) | product |

TABLE 17

| Ink set | | Light magenta | Magenta | Remarks |
|---|---|---|---|---|
| 148 | Dye | d-1 | d-1 | Invention |
| | Compound of formula (I) (molar ratio relative to dye) | I-66 (100 mol %) | I-66 (100) | product |
| 149 | Dye | d-1 | d-1 | Comparative |
| | Compound of formula (I) (molar ratio relative to dye) | — | — | example |
| 150 | Dye | e-4 | e-4 | Invention |
| | Compound of formula (I) (molar ratio relative to dye) | I-13 (100 mol %) | I-13 (100) | product |
| 151 | Dye | e-4 | e-4 | Invention |
| | Compound of formula (I) (molar ratio relative to dye) | I-35 (100 mol %) | I-35 (100) | product |
| 152 | Dye | e-4 | e-4 | Invention |
| | Compound of formula (I) (molar ratio relative to dye) | I-51 (100 mol %) | I-51 (100) | product |
| 153 | Dye | e-4 | e-4 | Invention |
| | Compound of formula (I) (molar ratio relative to dye) | I-58 (100 mol %) | I-58 (100) | product |
| 154 | Dye | e-4 | e-4 | Invention |
| | Compound of formula (I) (molar ratio relative to dye) | I-78 (100 mol %) | I-78 (100) | product |
| 155 | Dye | e-4 | e-4 | Invention |
| | Compound of formula (I) (molar ratio relative to dye) | I-66 (100 mol %) | I-66 (100) | product |
| 156 | Dye | e-4 | e-4 | Comparative |
| | Compound of formula (I) (molar ratio relative to dye) | — | — | example |
| 157 | Dye | a-27 | a-27 | Invention |
| | Compound of formula (I) (molar ratio relative to dye) | I-35 (50 mol %) | I-35 (50) | product |
| | Compound of formula (I) (molar ratio relative to dye) | I-51 (50 mol %) | I-51 (50) | |
| 158 | Dye | a-27 | a-27 | Invention |
| | Compound of formula (I) (molar ratio relative to dye) | I-35 (50 mol %) | I-35 (50) | product |
| | Compound of formula (I) (molar ratio relative to dye) | I-71 (50 mol %) | I-71 (50) | |
| 159 | Dye | a-27 | a-27 | Invention |
| | Compound of formula (I) (molar ratio relative to dye) | I-35 (33 mol %) | I-35 (33) | product |
| | Compound of formula (I) (molar ratio relative to dye) | I-51 (33 mol %) | I-51 (33) | |
| | Compound of formula (I) (molar ratio relative to dye) | I-71 (33 mol %) | I-71 (33) | |
| 160 | Dye | a-27/b-5 | a-26 | Invention |
| | Compound of formula (I) (molar ratio relative to dye) | I-35 (100 mol %) | I-35 (100) | product |
| 161 | Dye | a-27/b-5 | a-26 | Invention |
| | Compound of formula (I) (molar ratio relative to dye) | I-51 (100 mol %) | I-51 (100) | product |
| 162 | Dye | a-27/b-5 | a-26 | Invention |
| | Compound of formula (I) (molar ratio relative to dye) | I-78 (100 mol %) | I-78 (100) | product |
| 163 | Dye | a-27/b-5 | a-26 | Invention |
| | Compound of formula (I) (molar ratio relative to dye) | I-66 (100 mol %) | I-66 (100) | product |
| 164 | Dye | a-27/b-5 | a-26 | Invention |
| | Compound of formula (I) (molar ratio relative to dye) | I-35 (100 mol %) | I-35 (100) | product |
| | Compound of formula (I) (molar ratio relative to dye) | I-51 (100 mol %) | I-51 (100) | |
| 165 | Dye | a-27/b-5 | a-26 | Invention |
| | Compound of formula (I) (molar ratio relative to dye) | I-35 (100 mol %) | I-35 (100) | product |
| | Compound of formula (I) (molar ratio relative to dye) | I-71 (100 mol %) | I-71 (100) | |
| 166 | Dye | a-27/b-5 | a-26 | Comparative |
| | Compound of formula (I) (molar ratio relative to dye) | — | — | example |
| 167 | Dye | A-1 7.0 g/l | A-1 28.0 g/l | Comparative |
| | Compound of formula (I) (molar ratio relative to dye) | — | | example |

These Ink sets 101 to 167 were filled in the cartridge of "Ink Jet Printer PM670C" (trade name; product of EPSON) and by this printer, images were printed on photo-quality inkjet glossy paper EX manufactured by Fuji Photo Film. Following evaluation was conducted.

1) Printing performance (1) was evaluated by setting the cartridge in the printer; printing images onto 20 sheets of A4-size paper after confirmation of ink discharge from all the nozzles; and then ranking the degree of disturbance of the printed images in accordance with the following criteria.
   - A: Disturbance of the printed image did not occur at all during printing.
   - B: Disturbance of the printed image occurred.
   - C: Disturbance of the printed image continued from the start to the end of printing.
2) Printing performance (2) was evaluated by leaving the cartridge to stand for 2 days at 60° C.; and ranking the degree of disturbance of the printed image in a similar manner to that employed for printing performance (1).
3) Dryness was evaluated visually by the stain which appeared when the just printed images were touched with fingers.
4) Bleeding of thin lines was evaluated as follows: (i) thin-line patterns of yellow, magenta, cyan and black were printed and they were visually evaluated. (ii) thin-line patterns of black was printed on the printed solid color of magenta ink and bleeding caused by contact of two colors was evaluated.
5) Water resistance was evaluated by the bleeding of images after immersed in deionized water for 10 seconds.
6) The shelf life of the image was evaluated by the printed solid image sample of magenta.

(1) After measurement of the image density Ci rightly after printing, the image was exposed to xenon light (85000 lx) for 10 days by using a weatherometer (product of ATLAS). The image density Cf was measured again. From a dye remaining ratio Cf/Ci*100, light fastness was evaluated.

2) The densities before and after the storage of the sample for 14 days under the conditions of 80° C. at 15% RH were measured using X-rite 310 and a dye remaining ratio was calculated in a similar manner to that employed for evaluation of light fastness. Thus, the dark heat fastness was evaluated.

3) Ozone resistance: The densities before and after storage of the sample for 3 days under the ozone concentration of 1.0 ppm was measured by X-rite 310 and a dye remaining ratio was calculated. Based on it, ozone resistance was evaluated.

The results are shown in Tables 18 and 19.

In tables 18 and 19, “O” means “good” and “x” means “bad”.

TABLE 18

| Ink set | Printing performance (1) | Printing performance (2) | Dryness | Bleeding (1) | Bleeding (2) | Water resistance | Light fastness | Dark heat fastness | Ozone resistance | Remarks |
|---|---|---|---|---|---|---|---|---|---|---|
| 101 | A | A | ○ (good) | ○ | ○ | ○ | 83 | 98 | 97 | Invention product |
| 102 | A | A | ○ | ○ | ○ | ○ | 88 | 97 | 96 | Invention product |
| 103 | A | A | ○ | ○ | ○ | ○ | 90 | 97 | 98 | Invention product |
| 104 | A | A | ○ | ○ | ○ | ○ | 89 | 96 | 98 | Invention product |
| 105 | A | A | ○ | ○ | ○ | ○ | 91 | 98 | 96 | Invention product |
| 106 | A | A | ○ | ○ | ○ | ○ | 88 | 97 | 97 | Invention product |
| 107 | A | A | ○ | ○ | ○ | ○ | 89 | 98 | 96 | Invention product |
| 108 | A | A | ○ | ○ | ○ | ○ | 89 | 97 | 98 | Invention product |
| 109 | A | A | ○ | ○ | ○ | ○ | 89 | 97 | 97 | Invention product |
| 110 | A | A | ○ | ○ | ○ | ○ | 91 | 96 | 98 | Invention product |
| 111 | A | A | ○ | ○ | ○ | ○ | 88 | 98 | 98 | Invention product |
| 112 | A | A | ○ | ○ | ○ | ○ | 89 | 97 | 97 | Invention product |
| 113 | A | A | ○ | ○ | ○ | ○ | 89 | 98 | 97 | Invention product |
| 114 | A | A | ○ | ○ | ○ | ○ | 88 | 98 | 96 | Invention product |
| 115 | A | A | ○ | ○ | ○ | ○ | 87 | 97 | 98 | Invention product |
| 116 | A | A | ○ | ○ | ○ | ○ | 89 | 96 | 97 | Invention product |
| 117 | A | A | ○ | ○ | ○ | ○ | 88 | 96 | 98 | Invention product |
| 118 | A | A | ○ | ○ | ○ | ○ | 87 | 97 | 98 | Invention product |
| 119 | A | A | ○ | ○ | ○ | ○ | 89 | 97 | 97 | Invention product |
| 120 | A | A | ○ | ○ | ○ | ○ | 88 | 98 | 96 | Invention product |
| 121 | A | A | ○ | ○ | ○ | ○ | 81 | 97 | 96 | Comparative example |
| 122 | A | A | ○ | ○ | ○ | ○ | 88 | 98 | 97 | Invention product |
| 123 | A | A | ○ | ○ | ○ | ○ | 90 | 98 | 97 | Invention product |
| 124 | A | A | ○ | ○ | ○ | ○ | 89 | 97 | 96 | Invention product |
| 125 | A | A | ○ | ○ | ○ | ○ | 88 | 97 | 97 | Invention product |
| 126 | A | A | ○ | ○ | ○ | ○ | 87 | 96 | 98 | Invention product |
| 127 | A | A | ○ | ○ | ○ | ○ | 90 | 96 | 98 | Invention product |
| 128 | A | A | ○ | ○ | ○ | ○ | 78 | 97 | 97 | Comparative example |
| 129 | A | A | ○ | ○ | ○ | ○ | 87 | 96 | 98 | Invention product |
| 130 | A | A | ○ | ○ | ○ | ○ | 88 | 96 | 97 | Invention product |

TABLE 18-continued

| Ink set | Printing performance (1) | Printing performance (2) | Dryness | Bleeding (1) | Bleeding (2) | Water resistance | Light fastness | Dark heat fastness | Ozone resistance | Remarks |
|---|---|---|---|---|---|---|---|---|---|---|
| 131 | A | A | ○ | ○ | ○ | ○ | 88 | 97 | 97 | Invention product |
| 132 | A | A | ○ | ○ | ○ | ○ | 89 | 98 | 97 | Invention product |
| 133 | A | A | ○ | ○ | ○ | ○ | 87 | 98 | 98 | Invention product |
| 134 | A | A | ○ | ○ | ○ | ○ | 88 | 97 | 98 | Invention product |
| 135 | A | A | ○ | ○ | ○ | ○ | 76 | 98 | 97 | Comparative example |

TABLE 19

| Ink set | Printing performance (1) | Printing performance (2) | Dryness | Bleeding (1) | Bleeding (2) | Water resistance | Light fastness | Dark heat fastness | Ozone resistance | Remarks |
|---|---|---|---|---|---|---|---|---|---|---|
| 136 | A | A | ○ | ○ | ○ | ○ | 86 | 97 | 97 | Invention product |
| 137 | A | A | ○ | ○ | ○ | ○ | 86 | 97 | 97 | Invention product |
| 138 | A | A | ○ | ○ | ○ | ○ | 87 | 96 | 98 | Invention product |
| 139 | A | A | ○ | ○ | ○ | ○ | 86 | 98 | 97 | Invention product |
| 140 | A | A | ○ | ○ | ○ | ○ | 85 | 97 | 96 | Invention product |
| 141 | A | A | ○ | ○ | ○ | ○ | 86 | 96 | 98 | Invention product |
| 142 | A | A | ○ | ○ | ○ | ○ | 74 | 98 | 97 | Comparative example |
| 143 | A | A | ○ | ○ | ○ | ○ | 87 | 97 | 97 | Invention product |
| 144 | A | A | ○ | ○ | ○ | ○ | 88 | 97 | 96 | Invention product |
| 145 | A | A | ○ | ○ | ○ | ○ | 88 | 98 | 98 | Invention product |
| 146 | A | A | ○ | ○ | ○ | ○ | 87 | 97 | 96 | Invention product |
| 147 | A | A | ○ | ○ | ○ | ○ | 86 | 97 | 97 | Invention product |
| 148 | A | A | ○ | ○ | ○ | ○ | 88 | 96 | 96 | Invention product |
| 149 | A | A | ○ | ○ | ○ | ○ | 75 | 97 | 96 | Comparative example |
| 150 | A | A | ○ | ○ | ○ | ○ | 84 | 98 | 97 | Invention product |
| 151 | A | A | ○ | ○ | ○ | ○ | 86 | 98 | 98 | Invention product |
| 152 | A | A | ○ | ○ | ○ | ○ | 85 | 96 | 98 | Invention product |
| 153 | A | A | ○ | ○ | ○ | ○ | 87 | 97 | 97 | Invention product |
| 154 | A | A | ○ | ○ | ○ | ○ | 86 | 96 | 98 | Invention product |
| 155 | A | A | ○ | ○ | ○ | ○ | 85 | 98 | 97 | Invention product |
| 156 | A | A | ○ | ○ | ○ | ○ | 74 | 97 | 97 | Comparative example |
| 157 | A | A | ○ | ○ | ○ | ○ | 88 | 98 | 96 | Invention product |
| 158 | A | A | ○ | ○ | ○ | ○ | 89 | 98 | 97 | Invention product |
| 159 | A | A | ○ | ○ | ○ | ○ | 90 | 97 | 98 | Invention product |
| 160 | A | A | ○ | ○ | ○ | ○ | 89 | 98 | 96 | Invention product |
| 161 | A | A | ○ | ○ | ○ | ○ | 89 | 97 | 97 | Invention product |

TABLE 19-continued

| Ink set | Printing performance (1) | Printing performance (2) | Dryness | Bleeding (1) | Bleeding (2) | Water resistance | Light fastness | Dark heat fastness | Ozone resistance | Remarks |
|---|---|---|---|---|---|---|---|---|---|---|
| 162 | A | A | ○ | ○ | ○ | ○ | 88 | 97 | 96 | Invention product |
| 163 | A | A | ○ | ○ | ○ | ○ | 87 | 96 | 97 | Invention product |
| 164 | A | A | ○ | ○ | ○ | ○ | 88 | 97 | 97 | Invention product |
| 165 | A | A | ○ | ○ | ○ | ○ | 89 | 98 | 98 | Invention product |
| 166 | A | A | ○ | ○ | ○ | ○ | 82 | 96 | 96 | Comparative example |
| 167 | A | A | ○ | x (bad) | x | x | 72 | 97 | 44 | Comparative example |

The invention ink compositions containing the compound of the formula (I) are found to generate less streaks due to clogging of a nozzle and also free from bleeding of thin lines, and have excellent dryness and water resistance, even if their concentration is high at the time of printing. In particular, it is apparent that they are excellent in the shelf life of images with high light fastness.

Example 2

Ink compositions similar to those prepared in Example 1 were filled in the cartridge of “Ink Jet Printer BJ-F850” (trade name; product of Canon Inc.) and by this printer, images were printed on photo-quality inkjet glossy paper EX manufactured by Fuji Photo Film. The images were evaluated as in Example 1, leading to similar results to Example 1.

Example 3

(Preparation of Ink set 201)

At 70° C., 8 g of Dye (a-22) and 5 g of dioctyl sulfosuccinate were dissolved in 6 g of High boiling point organic solvent (s-1), 10 g of High boiling point organic solvent (s-2) and 50 ml of ethyl acetate. In the resulting solution was added 500 ml of deionized water while stirring by a magnetic stirrer, whereby an oil-in-water type coarse-particle dispersion was prepared.

Then, this coarse-particle dispersion was caused to pass through “Microfluidizer” (manufactured by Microfluidics Inc.) five times at 60 MPa to convert the dispersion into fine droplets. The resulting emulsion was desolvated in a rotary evaporator until an ethyl acetate odor disappeared. After addition of 140 g of diethylene glycol, 64 g of glycerin, 7 g of “SURFYNOL 465” (product of Air Products & Chemicals) and an additive such as urea to the resulting fine emulsion of the oil soluble dye, 900 ml of deionized water was added. The mixture was adjusted to pH 9 with 10 mol/l of KOH, whereby a light magenta ink as shown in Table 20 was prepared. The volume-average particle size of the ink thus dispersed in the form of emulsion was found to be 51 nm as a result of measurement using “Microtrac UPA” (manufactured by Nikkiso Co., Ltd.).

By changing the kind of the dye, magenta ink, light cyan ink, cyan ink, yellow ink and black ink for Ink set 201 as shown in Table 20 were prepared.

TABLE 20

| | Light magenta | Magenta | Light cyan | Cyan | Yellow | Black |
|---|---|---|---|---|---|---|
| Dye (g/l) | (e-22) 5.00 | (a-22) 20.0 | C-1 9.3 | C-1 37.2 | Y-1 27.2 | (a-22) 10.0 C-1 18.6 Y-1 13.6 |
| High-boiling-point organic solvent (g/l) | S-1 3.63 S-2 6.38 | 14.52 25.52 | 6.75 11.9 | 27.0 47.6 | 19.74 34.7 | 30.6 53.8 |
| Sodium dioctyl-sulfosuccinate (g/l) | 6.25 | 25.0 | 11.6 | 46.4 | 34.0 | 52.7 |
| Diethylene glycol (g/l) | 110.0 | 110.0 | 110.0 | 110.0 | 110.0 | 110.0 |
| Urea (g/l) | 46.0 | 46.0 | 46.0 | 46.0 | 46.0 | 46.0 |
| Glycerin (g/l) | 50.0 | 50.0 | 50.0 | 50.0 | 50.0 | 50.0 |
| Surfynol 465 (g/l) | 5.5 | 5.5 | 5.5 | 5.5 | 5.5 | 5.5 |
| Triethanolamine (g/l) | 7.5 | 7.5 | 7.5 | 7.5 | 7.5 | 7.5 |
| Benzotriazole (g/l) | 0.075 | 0.075 | 0.075 | 0.075 | 0.075 | 0.075 |
| Proxel XL2 (g/l) | 2.5 | 2.5 | 2.5 | 2.5 | 2.5 | 2.5 |
| Deionized water was added to give the total amount of 1 liter. | | | | | | |
| Volume-average particle size | 51 nm | 53 nm | 62 nm | 65 nm | 59 nm | 70 nm |

TABLE 20-continued

| | Light magenta | Magenta | Light cyan | Cyan | Yellow | Black |
|---|---|---|---|---|---|---|

C-1

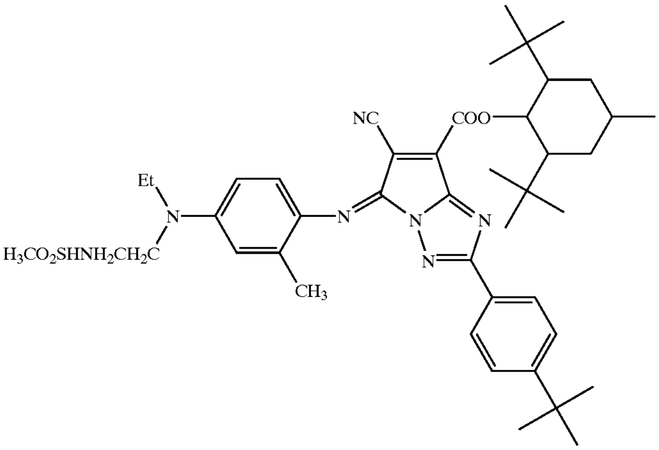

Y-1

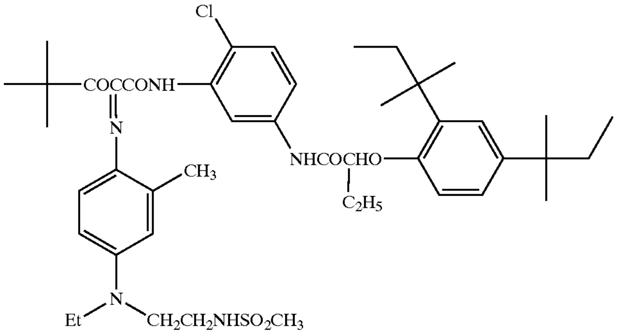

S-1

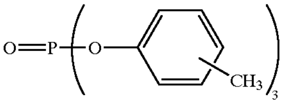

S-2

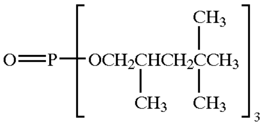

In a similar manner to that employed for Ink set 201 except that the dye of Ink set 201 was changed to each of the dyes as shown in Tables 21 to 25 so that the molar amount would be equal to that of the Ink set 201 (when at least two dyes are used in combination for the ink of the same color, they were used in an equimolar amount); the compound of the formula (I) was added to give the amount as shown in Tables 21 to 25 in terms of the molar ratio relative to the dye; and the magenta dye ((a-22) of Ink set 201), among the dyes to be used for the black ink, was added so that the molar amount of the dye used for the magenta ink in the same ink set would be equal to the amount of the ink set 201, whereby Ink sets 201 to 277 were prepared.

Ink sets 278 and 279 were prepared in a similar manner except that the pressure upon emulsification was changed to increase the volume-average particle size.

As the comparative ink set using a water soluble dye, Ink set 167 as shown in Table 19 was used.

TABLE 21

| Ink set | | Light magenta | Magenta | Remarks |
|---|---|---|---|---|
| 201 | Dye | a-22 | a-22 | Comparative |
| | Compound of formula (I) | — | — | example |
| | Volume-average particle size | 51 nm | 53 | |
| 202 | Dye | a-22 | a-22 | Invention |
| | Compound of formula (I) | I-11 (100 mol %) | I-11 (100 mol %) | product |
| | Volume-average particle size | 53 nm | 50 | |
| 203 | Dye | a-22 | a-22 | Invention |
| | Compound of formula (I) | I-31 (100 mol %) | I-31 (100 mol %) | product |
| | Volume-average particle size | 53 nm | 50 | |
| 204 | Dye | a-22 | a-22 | Invention |
| | Compound of formula (I) | I-39 (100 mol %) | I-39 (100 mol %) | product |
| | Volume-average particle size | 53 nm | 50 | |
| 205 | Dye | a-22 | a-22 | Invention |
| | Compound of formula (I) | I-42 (100 mol %) | I-42 (100 mol %) | product |
| | Volume-average particle size | 53 nm | 50 | |
| 206 | Dye | a-22 | a-22 | Invention |
| | Compound of formula (I) | I-44 (100 mol %) | I-44 (100 mol %) | product |
| | Volume-average particle size | 53 nm | 50 | |
| 207 | Dye | a-22 | a-22 | Invention |
| | Compound of formula (I) | I-53 (100 mol %) | I-53 (100 mol %) | product |
| | Volume-average particle size | 53 nm | 50 | |
| 208 | Dye | a-22 | a-22 | Invention |
| | Compound of formula (I) | I-69 (100 mol %) | I-69 (100 mol %) | product |
| | Volume-average particle size | 53 nm | 50 | |
| 209 | Dye | a-22 | a-22 | Invention |
| | Compound of formula (I) | I-77 (100 mol %) | I-77 (100 mol %) | product |
| | Volume-average particle size | 53 nm | 50 | |
| 210 | Dye | a-23 | a-23 | Comparative |
| | Compound of formula (I) | — | — | example |
| | Volume-average particle size | 51 nm | 53 | |
| 211 | Dye | a-23 | a-23 | Invention |
| | Compound of formula (I) | I-11 (100 mol %) | I-11 (100 mol %) | product |
| | Volume-average particle size | 53 nm | 50 | |
| 212 | Dye | a-23 | a-23 | Invention |
| | Compound of formula (I) | I-31 (100 mol %) | I-31 (100 mol %) | product |
| | Volume-average particle size | 53 nm | 50 | |
| 213 | Dye | a-23 | a-23 | Invention |
| | Compound of formula (I) | I-39 (100 mol %) | I-39 (100 mol %) | product |
| | Volume-average particle size | 53 nm | 50 | |
| 214 | Dye | a-23 | a-23 | Invention |
| | Compound of formula (I) | I-42 (100 mol %) | I-42 (100 mol %) | product |
| | Volume-average particle size | 53 nm | 50 | |
| 215 | Dye | a-23 | a-23 | Invention |
| | Compound of formula (I) | I-44 (100 mol %) | I-44 (100 mol %) | product |
| | Volume-average particle size | 53 nm | 50 | |

TABLE 22

| Ink set | | Light magenta | Magenta | Remarks |
|---|---|---|---|---|
| 216 | Dye | a-23 | a-23 | Invention |
| | Compound of formula (I) | I-53 (100 mol %) | I-53 (100 mol %) | product |
| | Volume-average particle size | 53 nm | 50 | |
| 217 | Dye | a-23 | a-23 | Invention |
| | Compound of formula (I) | I-69 (100 mol %) | I-69 (100 mol %) | product |
| | Volume-average particle size | 53 nm | 50 | |
| 218 | Dye | a-23 | a-23 | Invention |
| | Compound of formula (I) | I-77 (100 mol %) | I-77 (100 mol %) | product |
| | Volume-average particle size | 53 nm | 50 | |
| 219 | Dye | b-6 | b-6 | Comparative |
| | Compound of formula (I) | — | — | example |
| | Volume-average particle size | 51 nm | 53 | |
| 220 | Dye | b-6 | b-6 | Invention |
| | Compound of formula (I) | I-11 (100 mol %) | I-11 (100 mol %) | product |
| | Volume-average particle size | 53 nm | 50 | |
| 221 | Dye | b-6 | b-6 | Invention |
| | Compound of formula (I) | I-31 (100 mol %) | I-31 (100 mol %) | product |
| | Volume-average particle size | 53 nm | 50 | |
| 222 | Dye | b-6 | b-6 | Invention |
| | Compound of formula (I) | I-39 (100 mol %) | I-39 (100 mol %) | product |
| | Volume-average particle size | 53 nm | 50 | |
| 223 | Dye | b-6 | b-6 | Invention |
| | Compound of formula (I) | I-42 (100 mol %) | I-42 (100 mol %) | product |
| | Volume-average particle size | 53 nm | 50 | |

TABLE 22-continued

| Ink set | | Light magenta | Magenta | Remarks |
|---|---|---|---|---|
| 224 | Dye | b-6 | b-6 | Invention |
| | Compound of formula (I) | I-44 (100 mol %) | I-44 (100 mol %) | product |
| | Volume-average particle size | 53 nm | 50 | |
| 225 | Dye | b-6 | b-6 | Invention |
| | Compound of formula (I) | I-53 (100 mol %) | I-53 (100 mol %) | product |
| | Volume-average particle size | 53 nm | 50 | |
| 226 | Dye | b-6 | b-6 | Invention |
| | Compound of formula (I) | I-69 (100 mol %) | I-69 (100 mol %) | product |
| | Volume-average particle size | 53 nm | 50 | |
| 227 | Dye | b-6 | b-6 | Invention |
| | Compound of formula (I) | I-77 (100 mol %) | I-77 (100 mol %) | product |
| | Volume-average particle size | 53 nm | 50 | |
| 228 | Dye | c-4 | c-4 | Comparative |
| | Compound of formula (I) | — | — | example |
| | Volume-average particle size | 51 nm | 53 | |
| 229 | Dye | c-4 | c-4 | Invention |
| | Compound of formula (I) | I-11 (100 mol %) | I-11 (100 mol %) | product |
| | Volume-average particle size | 53 nm | 50 | |
| 230 | Dye | c-4 | c-4 | Invention |
| | Compound of formula (I) | I-31 (100 mol %) | I-31 (100 mol %) | product |
| | Volume-average particle size | 53 nm | 50 | |
| 231 | Dye | c-4 | c-4 | Invention |
| | Compound of formula (I) | I-39 (100 mol %) | I-39 (100 mol %) | product |
| | Volume-average particle size | 53 nm | 50 | |

TABLE 23

| Ink set | | Light magenta | Magenta | Remarks |
|---|---|---|---|---|
| 232 | Dye | c-4 | c-4 | Invention |
| | Compound of formula (I) | I-42 (100 mol %) | I-42 (100 mol %) | product |
| | Volume-average particle size | 53 nm | 50 | |
| 233 | Dye | c-4 | c-4 | Invention |
| | Compound of formula (I) | I-44 (100 mol %) | I-44 (100 mol %) | product |
| | Volume-average particle size | 53 nm | 50 | |
| 234 | Dye | c-4 | c-4 | Invention |
| | Compound of formula (I) | I-53 (100 mol %) | I-53 (100 mol %) | product |
| | Volume-average particle size | 53 nm | 50 | |
| 235 | Dye | c-4 | c-4 | Invention |
| | Compound of formula (I) | I-69 (100 mol %) | I-69 (100 mol %) | product |
| | Volume-average particle size | 53 nm | 50 | |
| 236 | Dye | c-4 | c-4 | Invention |
| | Compound of formula (I) | I-77 (100 mol %) | I-77 (100 mol %) | product |
| | Volume-average particle size | 53 nm | 50 | |
| 237 | Dye | d-5 | d-5 | Comparative |
| | Compound of formula (I) | — | — | example |
| | Volume-average particle size | 51 nm | 53 | |
| 238 | Dye | d-5 | d-5 | Invention |
| | Compound of formula (I) | I-11 (100 mol %) | I-11 (100 mol %) | product |
| | Volume-average particle size | 53 nm | 50 | |
| 239 | Dye | d-5 | d-5 | Invention |
| | Compound of formula (I) | I-31 (100 mol %) | I-31 (100 mol %) | product |
| | Volume-average particle size | 53 nm | 50 | |
| 240 | Dye | d-5 | d-5 | Invention |
| | Compound of formula (I) | I-39 (100 mol %) | I-39 (100 mol %) | product |
| | Volume-average particle size | 53 nm | 50 | |
| 241 | Dye | d-5 | d-5 | Invention |
| | Compound of formula (I) | I-42 (100 mol %) | I-42 (100 mol %) | product |
| | Volume-average particle size | 53 nm | 50 | |
| 242 | Dye | d-5 | d-5 | Invention |
| | Compound of formula (I) | I-44 (100 mol %) | I-44 (100 mol %) | product |
| | Volume-average particle size | 53 nm | 50 | |
| 243 | Dye | d-5 | d-5 | Invention |
| | Compound of formula (I) | I-53 (100 mol %) | I-53 (100 mol %) | product |
| | Volume-average particle size | 53 nm | 50 | |
| 244 | Dye | d-5 | d-5 | Invention |
| | Compound of formula (I) | I-69 (100 mol %) | I-69 (100 mol %) | product |
| | Volume-average particle size | 53 nm | 50 | |
| 245 | Dye | d-5 | d-5 | Invention |
| | Compound of formula (I) | I-77 (100 mol %) | I-77 (100 mol %) | product |
| | Volume-average particle size | 53 nm | 50 | |
| 246 | Dye | e-2 | e-2 | Comparative |
| | Compound of formula (I) | — | — | example |
| | Volume-average particle size | 51 nm | 53 | |

TABLE 23-continued

| Ink set | | Light magenta | Magenta | Remarks |
|---|---|---|---|---|
| 247 | Dye | e-2 | e-2 | Invention |
| | Compound of formula (I) | I-11 (100 mol %) | I-11 (100 mol %) | product |
| | Volume-average particle size | 53 nm | 50 | |

TABLE 24

| Ink set | | Light magenta | Magenta | Remarks |
|---|---|---|---|---|
| 248 | Dye | e-2 | e-2 | Invention |
| | Compound of formula (I) | I-31 (100 mol %) | I-31 (100 mol %) | product |
| | Volume-average particle size | 53 nm | 50 | |
| 249 | Dye | e-2 | e-2 | Invention |
| | Compound of formula (I) | I-39 (100 mol %) | I-39 (100 mol %) | product |
| | Volume-average particle size | 53 nm | 50 | |
| 250 | Dye | e-2 | e-2 | Invention |
| | Compound of formula (I) | I-42 (100 mol %) | I-42 (100 mol %) | product |
| | Volume-average particle size | 53 nm | 50 | |
| 251 | Dye | e-2 | e-2 | Invention |
| | Compound of formula (I) | I-44 (100 mol %) | I-44 (100 mol %) | product |
| | Volume-average particle size | 53 nm | 50 | |
| 252 | Dye | e-2 | e-2 | Invention |
| | Compound of formula (I) | I-53 (100 mol %) | I-53 (100 mol %) | product |
| | Volume-average particle size | 53 nm | 50 | |
| 253 | Dye | e-2 | e-2 | Invention |
| | Compound of formula (I) | I-69 (100 mol %) | I-69 (100 mol %) | product |
| | Volume-average particle size | 53 nm | 50 | |
| 254 | Dye | e-2 | e-2 | Invention |
| | Compound of formula (I) | I-77 (100 mol %) | I-77 (100 mol %) | product |
| | Volume-average particle size | 53 nm | 50 | |
| 255 | Dye | a-22 | a-22 | Invention |
| | Compound of formula (I) | I-11, I-31 (100 mol %) | I-11, I-31 (100 mol %) | product |
| | Volume-average particle size | 53 nm | 50 | |
| 256 | Dye | a-22 | a-22 | Invention |
| | Compound of formula (I) | I-11, I-44 (100 mol %) | I-11, I-44 (100 mol %) | product |
| | Volume-average particle size | 53 nm | 50 | |
| 257 | Dye | a-22 | a-22 | Invention |
| | Compound of formula (I) | I-31, I-44 (100 mol %) | I-31, I-44 (100 mol %) | product |
| | Volume-average particle size | 53 nm | 50 | |
| 258 | Dye | a-22 | a-22 | Invention |
| | Compound of formula (I) | I-53, I-77 (100 mol %) | I-53, I-77 (100 mol %) | product |
| | Volume-average particle size | 53 nm | 50 | |
| 259 | Dye | a-22 | a-22 | Invention |
| | Compound of formula (I) | I-53, I-69 (100 mol %) | I-53, I-69 (100 mol %) | product |
| | Volume-average particle size | 53 nm | 50 | |
| 260 | Dye | a-22 | a-22 | Invention |
| | Compound of formula (I) | I-77, I-69 (100 mol %) | I-77, I-69 (100 mol %) | product |
| | Volume-average particle size | 53 nm | 50 | |
| 261 | Dye | a-22 | a-22 | Invention |
| | Compound of formula (I) | I-31, I-53 (100 mol %) | I-31, I-53 (100 mol %) | product |
| | Volume-average particle size | 53 nm | 50 | |
| 262 | Dye | a-22 | a-22 | Invention |
| | Compound of formula (I) | I-31, I-77 (100 mol %) | I-31, I-77 (100 mol %) | product |
| | Volume-average particle size | 53 nm | 50 | |
| 263 | Dye | a-22 | a-22 | Invention |
| | Compound of formula (I) | I-44, I-53 (100 mol %) | I-44, I-53 (100 mol %) | product |
| | Volume-average particle size | 53 nm | 50 | |

TABLE 25

| Ink set | | Light magenta | Magenta | Remarks |
|---|---|---|---|---|
| 264 | Dye | a-22 | a-22 | Invention |
| | Compound of formula (I) | I-11 (20 mol %) | I-11 (20 mol %) | product |
| | Volume-average particle size | 53 nm | 50 | |
| 265 | Dye | a-22 | a-22 | Invention |
| | Compound of formula (I) | I-11 (50 mol %) | I-11 (50 mol %) | product |
| | Volume-average particle size | 53 nm | 50 | |
| 266 | Dye | a-22 | a-22 | Invention |
| | Compound of formula (I) | I-11 (200 mol %) | I-11 (200 mol %) | product |
| | Volume-average particle size | 53 nm | 50 | |

TABLE 25-continued

| Ink set | | Light magenta | Magenta | Remarks |
|---|---|---|---|---|
| 267 | Dye | a-22 | a-22 | Invention product |
| | Compound of formula (I) | I-11 (500 mol %) | I-11 (500 mol %) | |
| | Volume-average particle size | 53 nm | 50 | |
| 268 | Dye | a-22, a-23 | a-22, a-23 | Comparative example |
| | Compound of formula (I) | — | — | |
| | Volume-average particle size | 51 nm | 53 | |
| 269 | Dye | a-22, b-6 | a-22, b-6 | Comparative example |
| | Compound of formula (I) | — | — | |
| | Volume-average particle size | 51 nm | 53 | |
| 270 | Dye | a-22, a-23 | a-22, a-23 | Invention product |
| | Compound of formula (I) | I-11 (100 mol %) | I-11 (100 mol %) | |
| | Volume-average particle size | 53 nm | 50 | |
| 271 | Dye | a-22, b-6 | a-22, b-6 | Invention product |
| | Compound of formula (I) | I-11 (100 mol %) | I-11 (100 mol %) | |
| | Volume-average particle size | 53 nm | 50 | |
| 272 | Dye | a-22, a-23 | a-22, a-23 | Invention product |
| | Compound of formula (I) | I-31 (100 mol %) | I-31 (100 mol %) | |
| | Volume-average particle size | 53 nm | 50 | |
| 273 | Dye | a-22, b-6 | a-22, b-6 | Invention product |
| | Compound of formula (I) | I-31 (100 mol %) | I-31 (100 mol %) | |
| | Volume-average particle size | 53 nm | 50 | |
| 274 | Dye | a-22, a-23 | a-22, a-23 | Invention product |
| | Compound of formula (I) | I-53 (100 mol %) | I-53 (100 mol %) | |
| | Volume-average particle size | 53 nm | 50 | |
| 275 | Dye | a-22, b-6 | a-22, b-6 | Invention product |
| | Compound of formula (I) | I-53 (100 mol %) | I-53 (100 mol %) | |
| | Volume-average particle size | 53 nm | 50 | |
| 276 | Dye | a-22, a-23 | a-22, a-23 | Invention product |
| | Compound of formula (I) | I-77 (100 mol %) | I-77 (100 mol %) | |
| | Volume-average particle size | 53 nm | 50 | |
| 277 | Dye | a-22, b-6 | a-22, b-6 | Invention product |
| | Compound of formula (I) | I-77 (100 mol %) | I-77 (100 mol %) | |
| | Volume-average particle size | 53 nm | 50 | |
| 278 | Dye | a-22, a-23 | a-22,a-23 | Comparative example |
| | Compound of formula (I) | — | — | |
| | Volume-average particle size | 305 nm | 331 | |
| 279 | Dye | a-22, b-6 | a-22, b-6 | Invention product |
| | Compound of formula (I) | I-77 (100 mol %) | I-77 (100 mol %) | |
| | Volume-average particle size | 305 nm | 331 | |

Each of these Ink sets 201 to 280 was filled in the cartridge of "Ink jet printer PM670C" (manufactured by EPSON) and by using this printer, images were printed on photo-quality inkjet glossy paper EX (product of Fuji Photo Film). They were evaluated as in Example 1.

The results thus obtained are shown in Tables 26 and 27. In tables 26 and 27, "O" means "good" and "x" means "bad".

TABLE 26

| Ink set | Printing performance (1) | Printing performance (2) | Dryness | Bleeding (1) | Bleeding (2) | Water resistance | Light fastness | Dark heat fastness | Ozone resistance | Remarks |
|---|---|---|---|---|---|---|---|---|---|---|
| 201 | A | A | ○ (good) | ○ | ○ | ○ | 82 | 96 | 94 | Comparative example |
| 202 | A | A | ○ | ○ | ○ | ○ | 88 | 95 | 94 | Invention product |
| 203 | A | A | ○ | ○ | ○ | ○ | 90 | 96 | 94 | Invention product |
| 204 | A | A | ○ | ○ | ○ | ○ | 89 | 94 | 96 | Invention product |
| 205 | A | A | ○ | ○ | ○ | ○ | 91 | 94 | 95 | Invention product |
| 206 | A | A | ○ | ○ | ○ | ○ | 88 | 94 | 94 | Invention product |
| 207 | A | A | ○ | ○ | ○ | ○ | 89 | 94 | 94 | Invention product |
| 208 | A | A | ○ | ○ | ○ | ○ | 91 | 96 | 94 | Invention product |
| 209 | A | A | ○ | ○ | ○ | ○ | 89 | 95 | 96 | Invention product |

TABLE 26-continued

| Ink set | Printing performance (1) | Printing performance (2) | Dryness | Bleeding (1) | Bleeding (2) | Water resistance | Light fastness | Dark heat fastness | Ozone resistance | Remarks |
|---|---|---|---|---|---|---|---|---|---|---|
| 210 | A | A | ○ | ○ | ○ | ○ | 81 | 95 | 95 | Comparative example |
| 211 | A | A | ○ | ○ | ○ | ○ | 88 | 93 | 94 | Invention product |
| 212 | A | A | ○ | ○ | ○ | ○ | 89 | 94 | 93 | Invention product |
| 213 | A | A | ○ | ○ | ○ | ○ | 89 | 93 | 94 | Invention product |
| 214 | A | A | ○ | ○ | ○ | ○ | 88 | 94 | 94 | Invention product |
| 215 | A | A | ○ | ○ | ○ | ○ | 87 | 94 | 93 | Invention product |
| 216 | A | A | ○ | ○ | ○ | ○ | 89 | 93 | 94 | Invention product |
| 217 | A | A | ○ | ○ | ○ | ○ | 88 | 94 | 94 | Invention product |
| 218 | A | A | ○ | ○ | ○ | ○ | 89 | 94 | 94 | Invention product |
| 219 | A | A | ○ | ○ | ○ | ○ | 78 | 94 | 96 | Comparative example |
| 220 | A | A | ○ | ○ | ○ | ○ | 87 | 96 | 95 | Invention product |
| 221 | A | A | ○ | ○ | ○ | ○ | 86 | 95 | 96 | Invention product |
| 222 | A | A | ○ | ○ | ○ | ○ | 85 | 96 | 94 | Invention product |
| 223 | A | A | ○ | ○ | ○ | ○ | 87 | 94 | 93 | Invention product |
| 224 | A | A | ○ | ○ | ○ | ○ | 86 | 93 | 95 | Invention product |
| 225 | A | A | ○ | ○ | ○ | ○ | 88 | 95 | 93 | Invention product |
| 226 | A | A | ○ | ○ | ○ | ○ | 89 | 93 | 94 | Invention product |
| 227 | A | A | ○ | ○ | ○ | ○ | 88 | 94 | 94 | Invention product |
| 228 | A | A | ○ | ○ | ○ | ○ | 74 | 94 | 94 | Comparative example |
| 229 | A | A | ○ | ○ | ○ | ○ | 85 | 94 | 93 | Invention product |
| 230 | A | A | ○ | ○ | ○ | ○ | 86 | 93 | 96 | Invention product |
| 231 | A | A | ○ | ○ | ○ | ○ | 86 | 96 | 95 | Invention product |
| 232 | A | A | ○ | ○ | ○ | ○ | 84 | 95 | 96 | Invention product |
| 233 | A | A | ○ | ○ | ○ | ○ | 85 | 95 | 94 | Invention product |
| 234 | A | A | ○ | ○ | ○ | ○ | 86 | 93 | 93 | Invention product |
| 235 | A | A | ○ | ○ | ○ | ○ | 86 | 94 | 95 | Invention product |
| 236 | A | A | ○ | ○ | ○ | ○ | 87 | 94 | 93 | Invention product |
| 237 | A | A | ○ | ○ | ○ | ○ | 74 | 94 | 94 | Comparative example |
| 238 | A | A | ○ | ○ | ○ | ○ | 85 | 93 | 93 | Invention product |
| 239 | A | A | ○ | ○ | ○ | ○ | 86 | 96 | 94 | Invention product |
| 240 | A | A | ○ | ○ | ○ | ○ | 86 | 94 | 94 | Invention product |

TABLE 27

| Ink set | Printing perfor-mance (1) | Printing perfor-mance (2) | Dry-ness | Bleed-ing (1) | Bleed-ing (2) | Water resis-tance | Light fastness | Dark heat fastness | Ozone resis-tance | Remarks |
|---|---|---|---|---|---|---|---|---|---|---|
| 241 | A | A | ○ | ○ | ○ | ○ | 87 | 96 | 94 | Invention product |
| 242 | A | A | ○ | ○ | ○ | ○ | 86 | 95 | 93 | Invention product |
| 243 | A | A | ○ | ○ | ○ | ○ | 87 | 95 | 95 | Invention product |
| 244 | A | A | ○ | ○ | ○ | ○ | 86 | 93 | 93 | Invention product |
| 245 | A | A | ○ | ○ | ○ | ○ | 86 | 94 | 93 | Invention product |
| 246 | A | A | ○ | ○ | ○ | ○ | 73 | 94 | 93 | Comparative example |
| 247 | A | A | ○ | ○ | ○ | ○ | 84 | 94 | 93 | Invention product |
| 248 | A | A | ○ | ○ | ○ | ○ | 86 | 94 | 94 | Invention product |
| 249 | A | A | ○ | ○ | ○ | ○ | 85 | 94 | 96 | Invention product |
| 250 | A | A | ○ | ○ | ○ | ○ | 85 | 93 | 95 | Invention product |
| 251 | A | A | ○ | ○ | ○ | ○ | 86 | 94 | 96 | Invention product |
| 252 | A | A | ○ | ○ | ○ | ○ | 84 | 96 | 94 | Invention product |
| 253 | A | A | ○ | ○ | ○ | ○ | 86 | 95 | 93 | Invention product |
| 254 | A | A | ○ | ○ | ○ | ○ | 85 | 96 | 94 | Invention product |
| 255 | A | A | ○ | ○ | ○ | ○ | 86 | 93 | 93 | Invention product |
| 256 | A | A | ○ | ○ | ○ | ○ | 89 | 94 | 95 | Invention product |
| 257 | A | A | ○ | ○ | ○ | ○ | 88 | 96 | 93 | Invention product |
| 258 | A | A | ○ | ○ | ○ | ○ | 88 | 95 | 93 | Invention product |
| 259 | A | A | ○ | ○ | ○ | ○ | 89 | 96 | 94 | Invention product |
| 260 | A | A | ○ | ○ | ○ | ○ | 89 | 94 | 93 | Invention product |
| 261 | A | A | ○ | ○ | ○ | ○ | 88 | 96 | 94 | Invention product |
| 262 | A | A | ○ | ○ | ○ | ○ | 87 | 95 | 96 | Invention product |
| 263 | A | A | ○ | ○ | ○ | ○ | 86 | 95 | 95 | Invention product |
| 264 | A | A | ○ | ○ | ○ | ○ | 86 | 93 | 96 | Invention product |
| 265 | A | A | ○ | ○ | ○ | ○ | 88 | 94 | 93 | Invention product |
| 266 | A | A | ○ | ○ | ○ | ○ | 91 | 93 | 93 | Invention product |
| 267 | A | A | ○ | ○ | ○ | ○ | 93 | 94 | 94 | Invention product |
| 268 | A | A | ○ | ○ | ○ | ○ | 81 | 94 | 93 | Comparative example |
| 269 | A | A | ○ | ○ | ○ | ○ | 80 | 94 | 94 | Comparative example |
| 270 | A | A | ○ | ○ | ○ | ○ | 88 | 93 | 96 | Invention product |
| 271 | A | A | ○ | ○ | ○ | ○ | 87 | 94 | 95 | Invention product |
| 272 | A | A | ○ | ○ | ○ | ○ | 88 | 96 | 96 | Invention product |
| 273 | A | A | ○ | ○ | ○ | ○ | 89 | 95 | 94 | Invention product |
| 274 | A | A | ○ | ○ | ○ | ○ | 87 | 96 | 93 | Invention product |
| 275 | A | A | ○ | ○ | ○ | ○ | 87 | 94 | 94 | Invention product |
| 276 | A | A | ○ | ○ | ○ | ○ | 89 | 96 | 93 | Invention product |
| 277 | A | A | ○ | ○ | ○ | ○ | 89 | 94 | 94 | Invention product |

TABLE 27-continued

| Ink set | Printing performance (1) | Printing performance (2) | Dryness | Bleeding (1) | Bleeding (2) | Water resistance | Light fastness | Dark heat fastness | Ozone resistance | Remarks |
|---|---|---|---|---|---|---|---|---|---|---|
| 278 | A | A | ○ | ○ | ○ | ○ | 82 | 96 | 94 | Comparative example |
| 279 | A | A | ○ | ○ | ○ | ○ | 89 | 95 | 94 | Invention product |
| 167 | A | A | ○ | x (bad) | x | x | 71 | 96 | 42 | Comparative example |

It has been found that use of the ink composition of the present invention permits exhibition of excellent printing performance and also excellent weather resistance and light fastness. The ink composition of the invention does not cause bleeding upon outputting thin lines.

Example 4

Each of the inks similar to those prepared in Example 3 was filled in the cartridge of "Ink jet printer BJ-F850" (manufactured by Canon Inc.) and by using this printer, images were printed on photo-quality inkjet glossy paper EX (product of Fuji Photo Film). They were evaluated as in Example 3, leading to similar results to Example 3.

The present invention makes it possible to provide, in aqueous ink advantageous from the viewpoints of handling ease, odor and safety, inkjet recording ink compositions featuring high discharge stability, good color development, excellent color hue, shelf life and particularly light fastness of recorded images, and excellent stability and water resistance. The present invention also makes it possible to overcome their drawbacks in quality such as bleeding of thin lines. The inkjet recording ink compositions according to the invention are capable of maintaining high discharge stability over time or even with the passage of time under severe conditions and is free from defects in color hue, shelf life, stability, water resistance and picture quality.

The entire disclosure of each and every foreign patent application from which the benefit of foreign priority has been claimed in the present application is incorporated herein by reference, as if fully set forth.

What is claimed is:

1. An ink composition for inkjet recording comprising:

an azo dye having an aromatic nitrogen-containing 6-membered heterocycle as a coupling component;

a compound represented by the following formula (I); and an aqueous medium, wherein the azo dye is dissolved or dispersed in the aqueous medium:

(I)

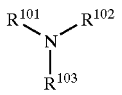

wherein $R^{101}$ and $R^{102}$ each independently represents a hydrogen atom, an aliphatic group, an aromatic group, a heterocyclic group, an acyl group, an aliphatic oxycarbonyl group, an aromatic oxycarbonyl group, an aliphatic sulfonyl group, an aromatic sulfonyl group, a substituted or unsubstituted carbamoyl group, or a substituted or unsubstituted thiocarbamoyl group;

$R^{103}$ represents an aliphatic group, an aromatic group, a heterocyclic group, an aliphatic oxy group, an aromatic oxy group, an aliphatic thio group, an aromatic thio group, an acyloxy group, an aliphatic oxycarbonyloxy group, an aromatic oxycarbonyloxy group, a substituted or unsubstituted amino group or a hydroxy group; and at least one of a pair $R^{101}$ and $R^{102}$, a pair $R^{102}$ and $R^{103}$, and a pair $R^{103}$ and $R^{101}$ may be coupled to form a 5-, 6- or 7-membered ring with the proviso that the ring formed is not a 2,2,6,6-tetraalkylpiperidine skeleton, wherein the azo dye is represented by the following formula (A-1):

(A-1)

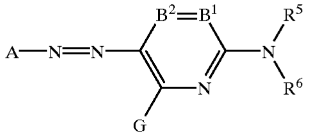

wherein A represents a 5-membered heterocyclic group, $B^1$ and $B^2$ represent —$CR^1$= and —$CR^2$=, respectively, or either one of $B^1$ and $B^2$ represents a nitrogen atom and the other one represents —$CR^1$= or —$CR^2$=, G, $R^1$, and $R^2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group substituted with an alkyl, aryl or heterocyclic group, an acylamino group, an ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an aryl thio group, a heterocyclic thin group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, each of which may further be substituted, and $R^5$ and $R^6$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, each of which may further be substituted, or a pair $R^1$ and $R^5$, or a pair $R^5$ and $R^6$ may be coupled to form a 5- or 6-membered ring, and wherein the compound represented by the formula (I) is a compound represented by the following formula (IA) or (IB):

(IA)

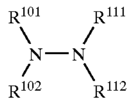

(IB)

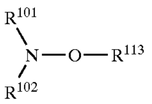

wherein $R^{111}$, $R^{112}$ and $R^{113}$ each independently represents a hydrogen atom, an aliphatic group, an aromatic group, a heterocyclic group, an acyl group, an aliphatic oxycarbonyl group, an aromatic oxycarbonyl group, an aliphatic sulfonyl group, an aromatic sulfonyl group, a substituted or unsubstituted carbamoyl group, or a substituted or unsubstituted thiocarbamoyl group.

2. The ink composition for inkjet recording according to claim 1, wherein A in the formula (A-1) represents one of the following formulae (a) to (f):

(a)

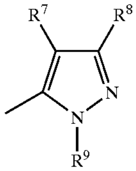

(b)

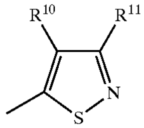

(c)

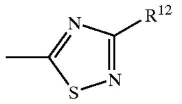

(d)

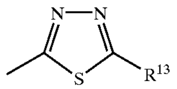

(e)

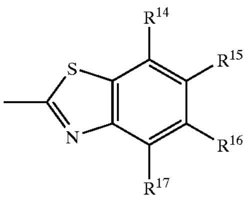

-continued (f)

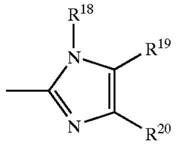

wherein $R^7$ to $R^{20}$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group substituted with an alkyl, aryl or heterocyclic group, an acylamino group, an ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an aryl thio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, each of which may further be substituted.

3. The ink composition for inkjet recording according to claim 1, wherein the dye represented by the formula (A-1) is a water soluble dye, and the ink composition is produced by at least one of the processes of:

dissolving the dye in the aqueous medium; and dispersing the dye in the aqueous medium.

4. The ink composition for inkjet recording according to claim 1, wherein the dye represented by the formula (A-1) is an oil soluble dye, and the ink composition is produced by the processes of:

dissolving the dye in a high-boiling-point organic solvent; and dispersing the organic solvent in the aqueous medium after the dissolving.

5. An inkjet recording method comprising:

preparing an image receiving material which comprises a support and image receiving layer comprising white inorganic pigment particles; and ejecting the ink composition according to claim 1 to the image receiving material according to a recording signal.

* * * * *